(12) United States Patent
Ehrlich et al.

(10) Patent No.: US 9,863,173 B2
(45) Date of Patent: *Jan. 9, 2018

(54) DOOR LOCKING ASSEMBLY FOR A STORAGE CONTAINER

(71) Applicant: Wabash National, L.P., Lafayette, IN (US)

(72) Inventors: Rodney P. Ehrlich, Monticello, IN (US); Robert Kleinschnitz, West Lafayette, IN (US); Danny L. Gilbert, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,154

(22) Filed: Feb. 1, 2016

(65) Prior Publication Data

US 2016/0145915 A1 May 26, 2016

Related U.S. Application Data

(63) Continuation of application No. 14/225,576, filed on Mar. 26, 2014, now Pat. No. 9,284,756, which is a
(Continued)

(51) Int. Cl.
*E05C 3/06* (2006.01)
*E05C 19/00* (2006.01)
(Continued)

(52) U.S. Cl.
CPC ............. *E05C 19/003* (2013.01); *B60J 5/108* (2013.01); *E05B 9/002* (2013.01); *E05B 9/08* (2013.01);
(Continued)

(58) Field of Classification Search
USPC .................. 292/197, 217, 218, 240, DIG. 32
See application file for complete search history.

(56) References Cited

U.S. PATENT DOCUMENTS 2,452,109 A  10/1948 Dath
2,861,830 A  11/1958 Bennett
(Continued)

OTHER PUBLICATIONS

PCT International Search Report and Written Opinion in corresponding PCT/US2009/037522 dated May 8, 2009 (9 pages).
First Office Action for U.S. Appl. No. 12/406,563 dated Sep. 21, 2011 , (6 pages).
Second Office Action for U.S. Appl. No. 12/406,563 dated Jan. 30, 2012, (7 pages).
(Continued)

*Primary Examiner* — Carlos Lugo
(74) *Attorney, Agent, or Firm* — Carli E. Stewart

(57) ABSTRACT

A locking assembly for a door of a storage container is provided. The storage container defines a door frame, and the door is movably mounted to the door frame. The locking assembly may include a first keeper secured to the door frame, a first locking cam configured to movably engage the first keeper, and a handle assembly coupled to the first locking cam. The handle assembly may be movable between a first position in which the handle assembly is in contact with the door frame and the first locking cam engages the first keeper to maintain the door in the closed position relative to the door frame and a second position in which the first locking cam disengages the first keeper to allow the door to open. The first and second positions of the handle assembly illustratively define an obtuse angle therebetween.

19 Claims, 18 Drawing Sheets

Related U.S. Application Data continuation of application No. 13/537,794, filed on Jun. 29, 2012, now Pat. No. 8,720,957, which is a continuation of application No. 12/406,563, filed on Mar. 18, 2009, now Pat. No. 8,231,150.

(60) Provisional application No. 61/069,889, filed on Mar. 19, 2008.

(51) Int. Cl.
| | | |
|---|---|---|
| *E05B 13/00* | (2006.01) | |
| *E05B 83/10* | (2014.01) | |
| *B60J 5/10* | (2006.01) | |
| *E05B 9/00* | (2006.01) | |
| *E05B 9/08* | (2006.01) | |
| *E05C 3/16* | (2006.01) | |
| *E05B 17/00* | (2006.01) | |
| *E05B 67/38* | (2006.01) | |

(52) U.S. Cl.
CPC ........... *E05B 13/002* (2013.01); *E05B 83/10* (2013.01); *E05C 19/001* (2013.01); *E05C 19/007* (2013.01); *E05B 17/0025* (2013.01); *E05B 67/383* (2013.01); *Y10S 292/32* (2013.01); *Y10T 292/1039* (2015.04); *Y10T 292/1048* (2015.04); *Y10T 292/1049* (2015.04); *Y10T 292/1077* (2015.04)

(56) References Cited

U.S. PATENT DOCUMENTS

| | | |
|---|---|---|
| 3,596,403 A | 8/1971 | Carr |
| 3,989,289 A | 11/1976 | Ringe |
| 4,082,330 A | 4/1978 | McWhorter |
| 4,175,781 A | 11/1979 | Dumortier |
| 4,581,907 A | 4/1986 | Eberly |
| 4,690,442 A | 9/1987 | Reynard |
| 4,768,816 A | 9/1988 | Bakula |
| 4,895,007 A | 1/1990 | Eberly |
| 5,016,393 A | 5/1991 | Weinerman |
| 5,154,458 A | 10/1992 | Cook et al. |
| 5,735,145 A | 4/1998 | Pernick |
| 5,735,146 A | 4/1998 | Taplin |
| 5,997,099 A | 12/1999 | Collins |
| 6,581,419 B1 | 6/2003 | Strodtman |
| 6,886,870 B2 | 5/2005 | Ehrlich |
| 8,231,150 B2 | 7/2012 | Ehrlich et al. |
| 8,720,957 B2 | 5/2014 | Ehrlich et al. |
| 9,284,756 B2 | 3/2016 | Ehrlich et al. |
| 2004/0217599 A1 | 11/2004 | Ueda |

OTHER PUBLICATIONS

First Office Action for U.S. Appl. No. 13/537,794, dated Feb. 12, 2013 ( 10 pages).
Second and Final Office Action for U.S. Appl. No. 13/537,794 dated Jul. 8, 2013 (8 pages).
First Office Action for U.S. Appl. No. 14/225,576, dated Jan. 9, 2015 (7 pages).
Second and Final Office Action for U.S. Appl. No. 14/225,576, dated May 11, 2015 (8 pages).

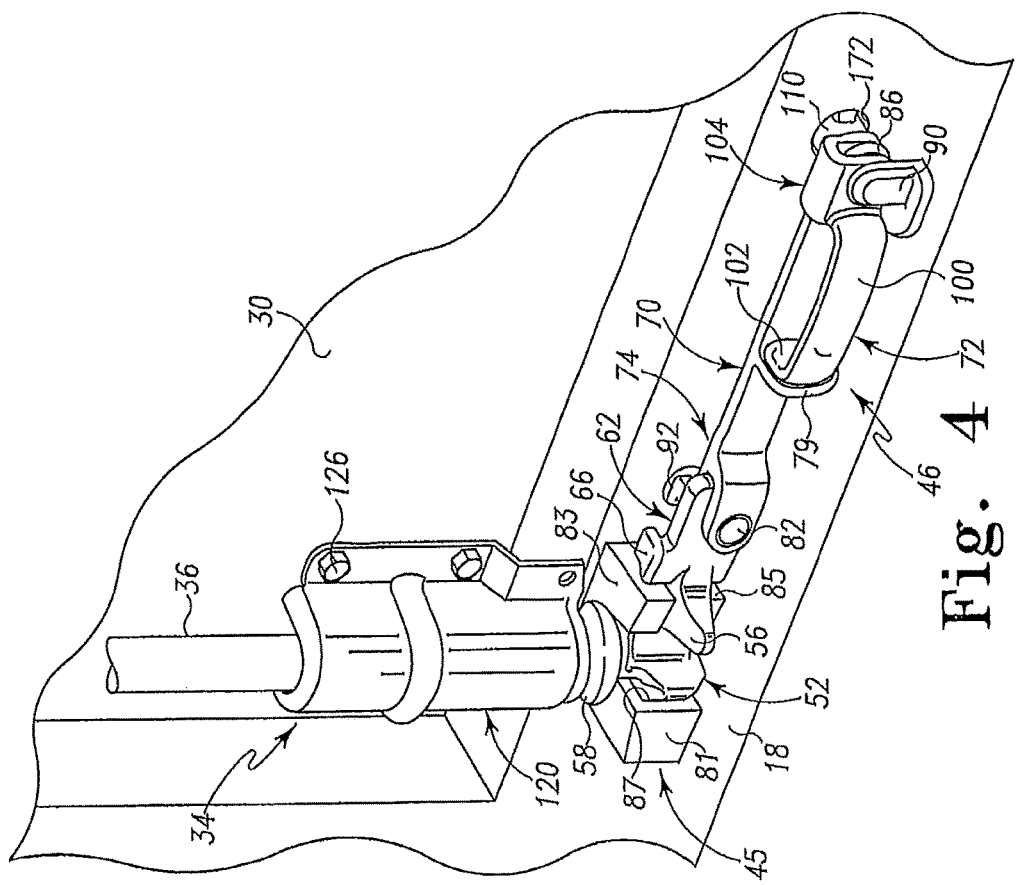

DOOR LOCKING ASSEMBLY FOR A STORAGE CONTAINER

This application claims the benefit under 35 U.S.C. §119 (e) to U.S. Provisional Patent Application Ser. No. 61/069,889, filed Mar. 19, 2008, the entire contents of which are incorporated by reference in its entirety. This application is a continuation and claims benefit of U.S. patent application Ser. No. 14/225,576 filed Mar. 26, 2014, which is a continuation and claims benefit of U.S. patent application Ser. No. 13/537,794 filed Jun. 29, 2012, now U.S. Pat. No. 8,720,957, which is a continuation and claims benefit of U.S. patent application Ser. No. 12/406,563 filed Mar. 18, 2009, now U.S. Pat. No. 8,231,150, the entirety of each of which is hereby incorporated by reference herein.

FIELD OF THE INVENTION

The present invention relates generally to storage containers, such as mobile storage containers, having one or more access doors, and more specifically to locking assemblies for maintaining such one or more doors in a closed or an open position.

BACKGROUND

Door locking assemblies for storage containers generally, and for mobile storage containers specifically, are known. It is desirable to improve the structure and/or operation of such door locking assemblies.

SUMMARY

The present invention may comprise one or more of the features recited in the attached claims, and/or one or more of the following features and combinations thereof.

According to one aspect of the present disclosure, a locking assembly is provided for a door of a storage container. Illustratively, the storage container defines a door frame and the door is movably mounted to the door frame. The locking assembly includes a lockrod configured to be coupled to the door, a locking cam coupled to an end of the lockrod, and a handle assembly coupled to the locking cam and configured for axial movement relative to the locking cam in a direction generally perpendicular to the lockrod.

In one illustrative embodiment, the locking cam may include a protrusion having a lateral slot formed therein. Further, the handle assembly may include a clevis configured to receive the protrusion between a first and second arm of the clevis. A fastener of the handle assembly may be received through an aperture of each of the first and second arms of the clevis and the slot of the protrusion such that the handle assembly is movable along an axis defined by the slot. Further illustratively, the protrusion may include a tab coupled to a top surface thereof and configured to engage one of the arms of the clevis in order to prevent rotation of the handle assembly relative to the locking cam. The locking cam may also include a stem coupled to the end of the lockrod and a cam body coupled to the stem. Illustratively, the cam body may include a first lobe and a second lobe spaced-apart from the first lobe to define a channel therebetween. The protrusion may be coupled to the second lobe of the locking cam.

In another illustrative embodiment, the handle assembly may be configured to be removably coupled to both a bottom frame member of the door frame and a side rail of the trailer coupled to the door frame and extending along a side of the trailer.

In still another illustrative embodiment, the handle assembly may include a first lock member configured to be received through a first aperture formed in the door frame and a second lock member configured to be received through a second aperture formed in the door frame when the handle assembly is in a locked position relative to the door frame. Illustratively, the first lock member may include a cylindrical rod and a tab member extending outwardly therefrom. The second lock member may include a hook-shaped protrusion. Further, the handle assembly may also include an elongated lever coupled to the locking cam and a handle pivotably coupled to the elongated lever. Illustratively, the first lock member may be coupled to the handle and the second lock member may be coupled to the lever. The elongated lever may include a first end coupled to the locking cam, a second end pivotably coupled to the handle, and a flange positioned between the first end and the second end. Further, the handle may be movable relative to the lever between a first position adjacent the flange and a second position spaced-apart from the flange of the elongated lever. Illustratively, the handle and the first lock member may be pivotable approximately 180° about a pivot axis relative to the lever.

According to another aspect of the present disclosure, a locking assembly for a door of a storage container defining a door frame includes a first keeper secured to the door frame, a first locking cam configured to movably engage the first keeper, and a handle assembly coupled to the first locking cam. Illustratively, the handle assembly is movable between a first position in which the handle assembly is in contact with the door frame and the first locking cam engages the first keeper to maintain the door in the closed position relative to the door frame and a second position in which the first locking cam disengages the first keeper to allow the door to open. Illustratively, the first and second positions of the handle assembly define an obtuse angle therebetween.

In one illustrative embodiment, the door frame may include at least one side frame member extending between a top frame member and a bottom frame member, and the door may be movably mounted to the at least one side frame member. Illustratively, the first keeper may be secured to the bottom frame member and the locking assembly may further include a second keeper secured to the top frame member. The locking assembly may also include a second locking cam configured to movably engage the second keeper and an elongated lockrod having the first locking cam mounted to one end thereof and the second locking cam mounted to an opposite end thereof. Illustratively, the lockrod may be rotatable via movement of the handle assembly to cause the first and second locking cams to move relative to the first and second keepers respectively.

In another illustrative embodiment, the handle assembly may include an elongated lever having one end coupled to the first locking cam and a handle movably mounted to an opposite end thereof. The handle may be movable relative to the lever between a first position in which the handle engages the bottom frame member of the door frame to secure the handle assembly to the bottom frame member and a second position in which the handle disengages the bottom frame member of the door frame to allow movement of the handle assembly relative to the bottom frame member. Further illustratively, the locking assembly may include a handle lock member extending from the handle. The handle lock member may be configured to extend into the first locking passageway and engage the bottom frame member when the handle is in the first position and disengage the bottom frame member when the handle is in the second position. The bottom frame member may further define a second locking passageway therein that is spaced apart from the first locking passageway and the lever may define a lever lock member extending therefrom adjacent to the one end thereof. Illustratively, the lever lock member may be configured to extend into the second locking passageway when the handle assembly is moved to the first position thereof in which the handle assembly is in contact with the bottom frame member. Further illustratively, the lever lock member and the handle lock member may each be configured to engage the bottom frame member to secure the handle assembly to the bottom frame member when the handle is moved to the first position thereof. Illustratively, one end of the lever may be movably mounted to the first locking cam to allow axial movement of the lever relative to the first locking cam.

According to still another aspect of the present disclosure, a storage container includes a rear frame and a door mounted in the rear frame. The rear frame includes a top frame member, a bottom frame member and two side frame members coupled to and extending between the top and bottom frame members. The bottom frame member includes a first locking aperture formed therein and a second locking aperture spaced-apart from the first locking aperture. The storage container further includes a lockrod mounted to the door, a lockrod cam coupled to a bottom end of the lockrod, and a lockrod keeper coupled to the bottom frame member of the rear frame and configured to receive the lockrod cam therein. A handle assembly of the storage container is coupled to the lockrod cam and movable between a locked position wherein the handle assembly is coupled to the bottom frame member and an unlocked position wherein the handle assembly is spaced-apart from the bottom frame member. Illustratively, the handle assembly includes a first lock member and a second lock member. The first lock member is configured to be received within the first locking aperture when the handle assembly is in the locked position, and the second lock member is configured to be received within the second locking aperture when the handle assembly is in the locked position.

In one illustrative embodiment, the storage container may further include a base rail coupled to the bottom frame member and configured to extend along a side of the storage container. The base side rail may include a third locking aperture formed therein and configured to receive the first lock member therethrough when the door of the storage container is in a fully opened position adjacent a sidewall of the storage container. Further illustratively, the base rail may include a fourth locking aperture spaced-apart from the third locking aperture and configured to receive the second lock member therethrough when the door of the storage container is in the fully opened position.

In another illustrative embodiment, the first locking aperture may be generally keyhole-shaped and the second locking aperture may be generally circularly-shaped.

In still another illustrative embodiment, the handle assembly may include a lever having a first end coupled to the lockrod cam and configured for axial movement relative thereto, and a handle coupled to a second end of the lever for pivoting movement relative thereto. Illustratively, the first lock member may be coupled to the handle and the second lock member may be coupled to the lever.

In any case, the storage container may comprise a transportable storage container configured to store one or more objects therein. For example, the storage container may comprise one of a towable trailer and a straight truck body.

BRIEF DESCRIPTION OF THE DRAWINGS

FIG. 4 is a perspective view of the lower portion of the trailer and the door locking mechanism of FIGS. 2 and 3 showing the door locking mechanism in a locked position.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same. While the concepts of this disclosure are described in relation to a towable trailer, it will be understood that they are equally applicable to storage containers generally, and more specifically to transportable containers for transporting one or more objects, examples of which include, but should not be limited to, straight truck bodies, mobile storage containers, small personal and/or commercial trailers and the like.

Figure 1:
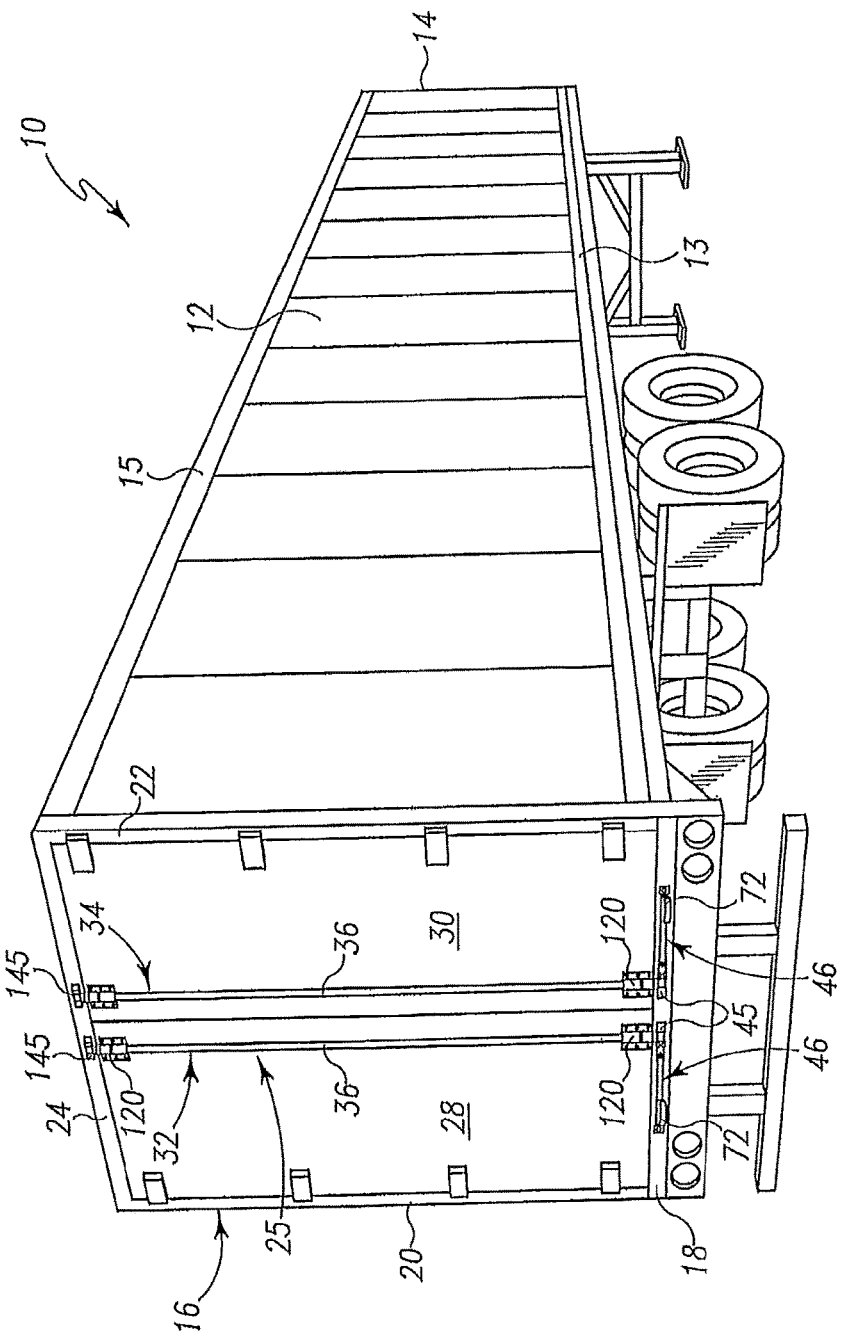
FIG. 1 is a rear perspective view of a trailer having a door locking assembly including two door locking mechanisms for maintaining rear doors of the trailer in a closed position.

Referring now to FIG. 1, one illustrative embodiment of a conventional trailer 10 is shown. In the illustrated embodiment, the trailer 10 includes a pair of opposing side walls 12 that extend the length of the trailer 10 and that are each attached at a front end thereof to a front wall 14. Each sidewall 12 is affixed at a bottom end thereof to a side or base rail 13, and at a top end to a top rail 15. Rear ends of each sidewall 12 are attached to a rear frame 16 of the trailer 10 that includes a bottom frame member or sill 18, and a pair of side frame members 20 and 22 extending upwardly from opposites ends of the sill 18 and connected at their opposite ends to a top frame member 24. The trailer 10 includes a locking assembly 25 that is generally mounted to the top frame member 24 and also to the bottom frame member or sill 18. The locking assembly 25 is further configured to be attached to each of two rear doors 28, 30 that are mounted to the side frame members 20 and 22, respectively, in a conventional manner such that the door 28 is hingedly coupled to and swings relative to the side frame member 20 between opened and closed positions, and the other door 30 is hingedly coupled to and swings relative to the side frame member 22 between open and closed positions.

As shown in FIG. 1, the locking assembly 25 includes a pair of door locking mechanisms 32 and 34 that are each configured to engage a respective one of the doors 28, 30. In particular, the door locking mechanism 32 is coupled to the door 28 while the door locking mechanism 34 is coupled to the door 30. The door locking mechanisms 32, 34 are provided to maintain each respective door 28, 30 in either a closed position or a fully open position as will be described herein. In the embodiment illustrated in FIG. 1, the door 28 is hingedly mounted to the side frame member 20 and the door 30 is hingedly mounted to the side frame member 22. The opposite free side of each of the doors 28, 30 is configured to engage the free side of the other of each of the doors 28, 30 when the doors 28, 30 are in their closed positions, as shown in FIG. 1. Illustratively, the door locking mechanisms 32, 34 are generally positioned adjacent the free side of the respective door 28, 30 to which each is coupled. While FIG. 1 and the embodiments described herein illustrate the door locking mechanisms 32, 34 for use with a conventional two-door trailer 10, it is understood that the each of the door locking mechanisms 32, 34 may be used with a trailer or other storage container in which only one rear door is provided.

For purposes of this document, structural embodiments and operation of the door locking mechanism 34 will be illustrated and described herein, although it will be understood that the door locking mechanism 32 is identical in configuration and operation. As shown in FIG. 1 and discussed in greater detail below, the door locking mechanism 34 includes an elongated lockrod 36 attached at an upper end thereof to an upper locking cam 142 (shown in FIGS. 12 and 13) that is configured to releasably engage an upper lockrod keeper 145 (shown in FIG. 13) mounted to the top frame member 24 of the trailer 10. The opposite, or bottom, end of the lockrod 36 is likewise attached to a lower locking cam 42 (shown in FIG. 2, for example) that is configured to releasably engage a lower lockrod keeper 45 (shown in FIGS. 4, 6, 10, and 11) mounted to the lower frame member or sill 18 of the trailer 10. The door locking mechanism 34 further includes a handle assembly 46 (shown in FIGS. 2 and 3) that is operatively connected to the lower locking cam 42. Illustratively, the lockrod 36 of each door locking mechanism 32, 34 is positioned adjacent the free side of the door 28, 30 to which it is attached and is coupled to the respective door 28, 30 at both upper and lower ends thereof via bearing plates 120, as discussed in greater detail below.

As noted above, the door locking mechanism 32 is substantially identical to the door locking mechanism 34, and similarly includes an elongated lockrod 36 attached at one end thereof to an upper locking cam 142 that is configured to releasably engage an upper lockrod keeper 145 mounted to the top frame member 22. The opposite end of the lockrod 36 is likewise attached to a lower locking cam 42 that is configured to releasably engage a lower lockrod keeper 45 mounted to the lower frame member or sill 18. The door locking mechanism 32 further includes a handle assembly 46 that is operatively connected to the lower locking cam 42. The lockrods 36 of each of the door locking mechanisms 32, 34 are illustratively cylindrical, although this disclosure contemplates embodiments in which the cross-sectional shapes of the lockrods 36 are non-circular as well.

Figure 2:
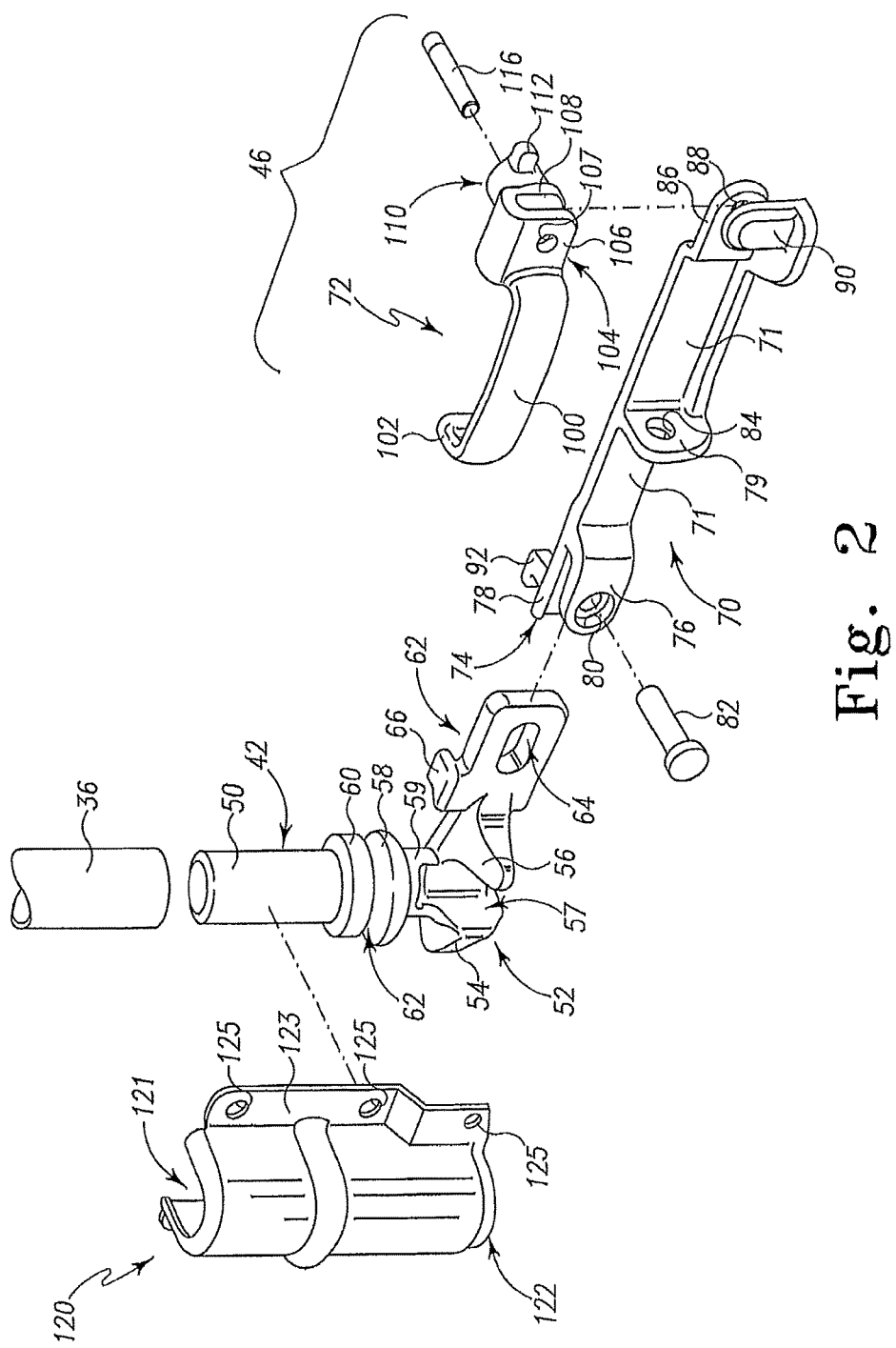
FIG. 2 is an exploded perspective view of a lower portion of one of the door locking mechanisms shown in FIG. 1.

Looking now to FIG. 2, the lower locking cam 42 of the door locking mechanism 34 includes a stem 50 received within the lower end of the lockrod 36. The stem 50 is coupled to a cam body 52 defining a pair of lobes 54, 56 separated by a gap or channel 57. The cam body 52 extends upwardly to define a neck portion 59 and a first collar 58 that extends about the neck portion 59. The lower locking cam 42 further defines a second collar 60 that is separated from the first collar 58 by a channel 62. As shown in FIG. 2, the stem 50 of the locking cam 42 extends upwardly from the upper collar 60.

The lower locking cam 42 further includes a protrusion 62 coupled to the cam body 52 and positioned adjacent the lobe 56 to extend outwardly in a lateral direction therefrom. As shown in FIG. 2, the protrusion 62 defines a slot 64 formed therein and a tab 66 coupled to a top surface of the protrusion 62 and configured to extend rearwardly therefrom. As is discussed in greater detail below, the protrusion 62 is coupled to the handle assembly 46 by a fastener received through the slot 64 and the handle assembly 46 in order to allow the handle assembly 46 to move laterally relative to the protrusion 62 between a first and second positions. Illustratively the tab 66 serves to inhibit rotation of the handle assembly 46 relative to the locking cam 42 by contacting a tab 78 of a generally U-shaped clevis 74 of the lever 70 and restricting movement of the yoke 74 relative to the protrusion 62.

Figure 6:
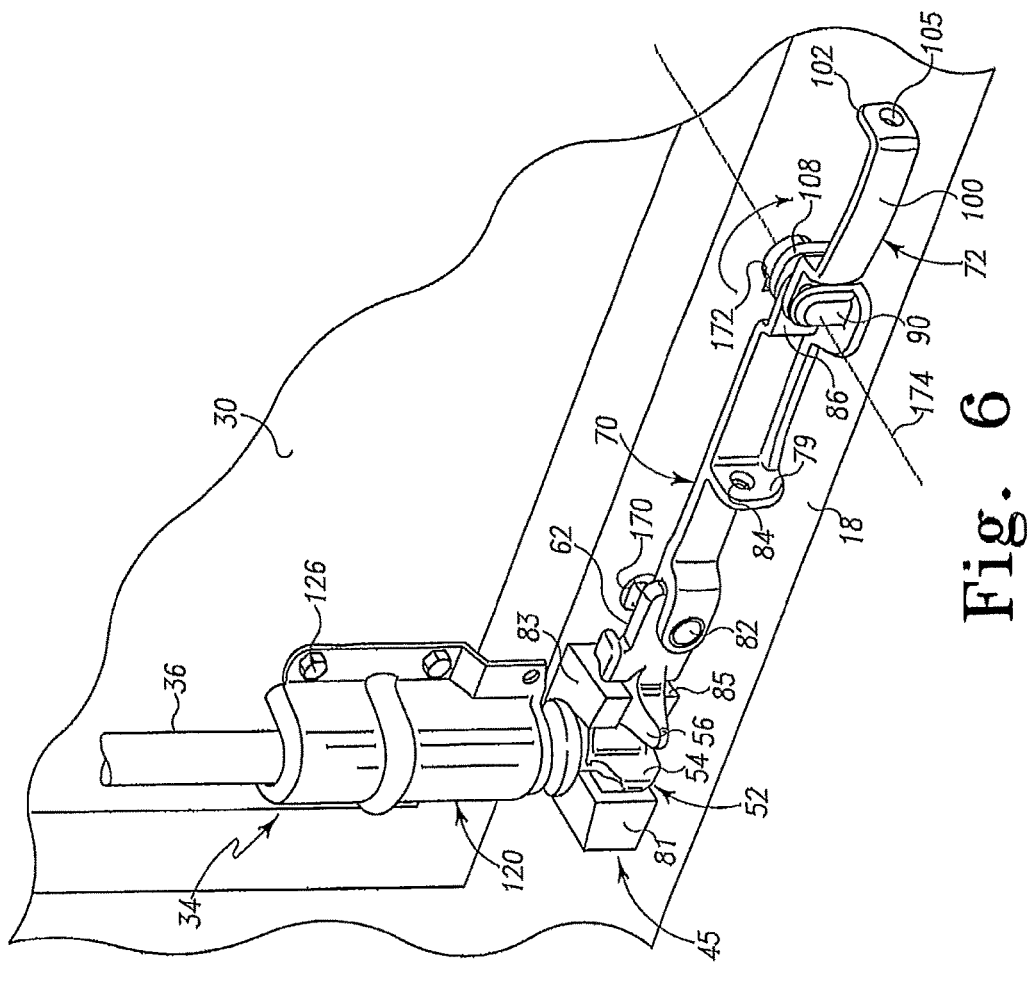
FIG. 6 is a perspective view similar to FIG. 4 showing a handle of the door locking mechanism in an unlocked or open position.
Figure 7:
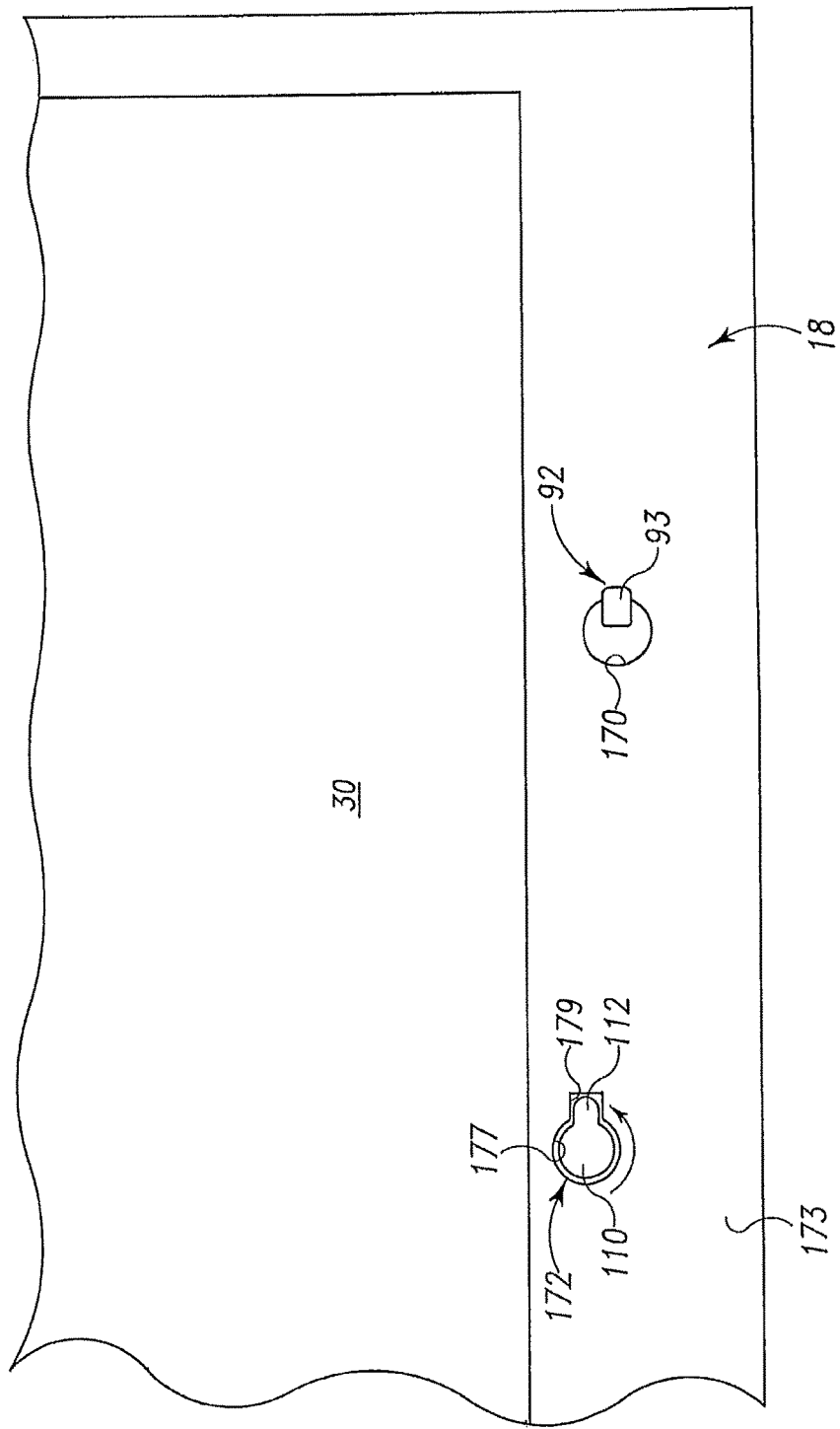
FIG. 7 is an elevation view similar to FIG. 5A and FIG. 5E showing one of the lock members rotated to an unlocked position for alignment with a similarly-shaped aperture formed in the bottom sill.

Looking again to FIGS. 2 and 3, the handle assembly 46 includes an elongated lever 70 and a handle 72 pivotably coupled to the lever 70 for movement relative to the lever between a first, locked position (shown in FIG. 4) and a second, unlocked position (shown in FIG. 6). As noted above, the lever 70 of the handle assembly 46 is movably mounted to the lower locking cam 42 for lateral movement relative thereto. Illustratively, the lever 70 includes a first end having the clevis 74 including a first arm or tab 76 and a second arm or tab 78 spaced-apart from the first tab 76. Each tab 76, 78 includes an aperture 80 formed therein and configured to receive a fastener, such as a bolt 82 therethrough. As shown in FIG. 2, the protrusion 62 of the locking cam 42 is received between the first and second tabs 76, 78 of the clevis 74, and the bolt 82 is received through the aperture 80 of the first tab 76, the slot 64 of the protrusion 62, and the aperture 80 of the second tab 78 in order to slidably couple the lever 70 to the locking cam 42. With the pin or bolt 82 extending successively through the aperture 80 of the tab 76, the slot 64 and the aperture 80 of the tab 78, the handle assembly 46 is configured to translate or move along the axis defined by the elongated slot 64 such that the handle assembly 46 generally, and the lever 70 specifically, can move axially toward and away from the locking cam 42 in a direction generally perpendicular to the lockrod 36.

Figure 3:
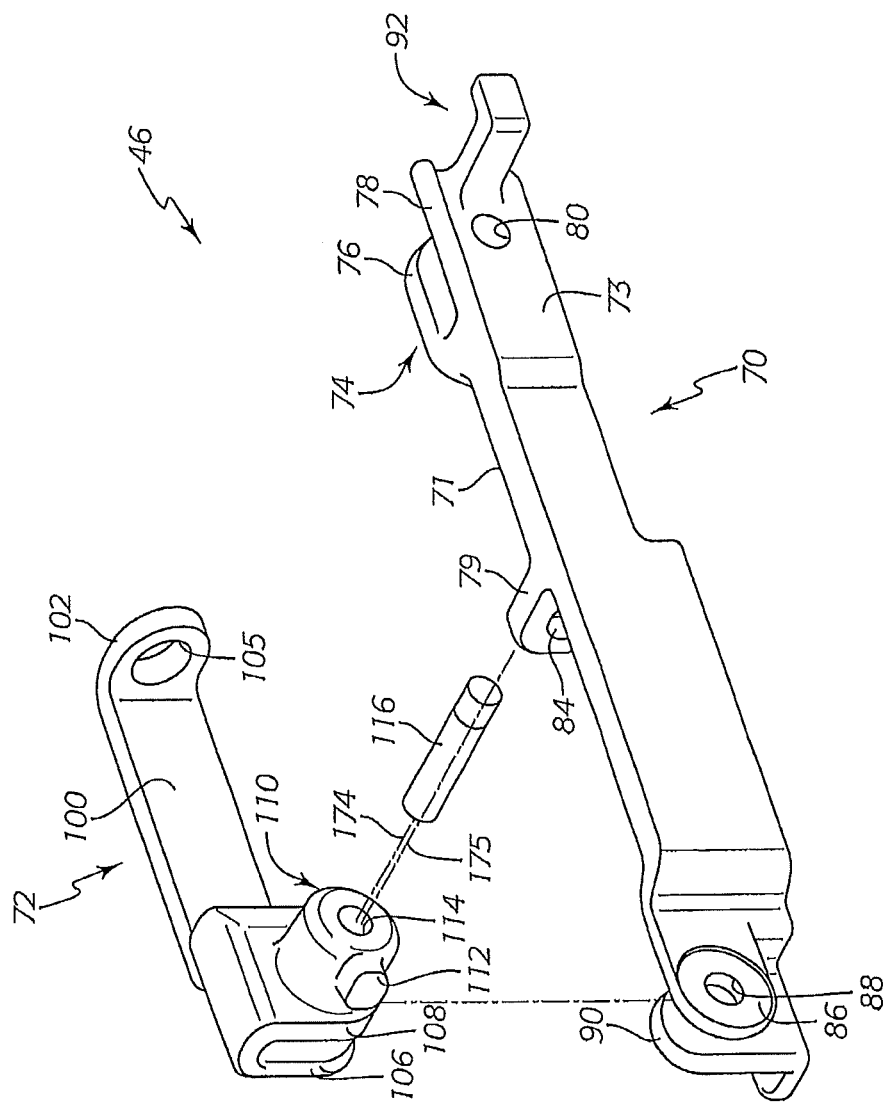
FIG. 3 is a rear perspective view of a handle assembly of the door locking mechanism of FIG. 2.
Figure 5A:
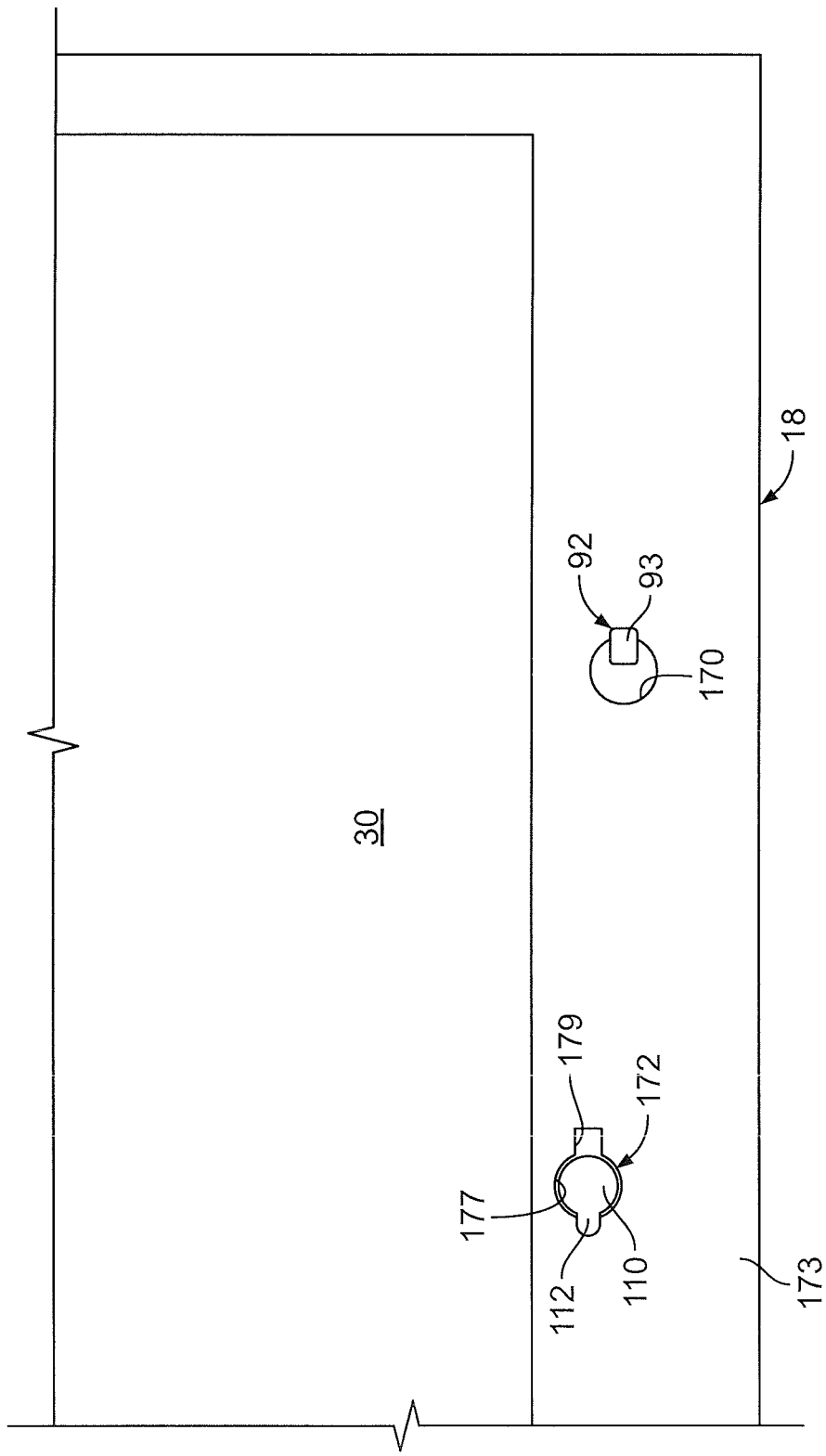
FIG. 5A is an elevation view of an inside surface of a portion of one of the rear doors of the trailer showing lock members of the handle assembly received within apertures formed in a bottom frame member or sill of the trailer when the door locking mechanism is in the locked position.
Figure 5B:
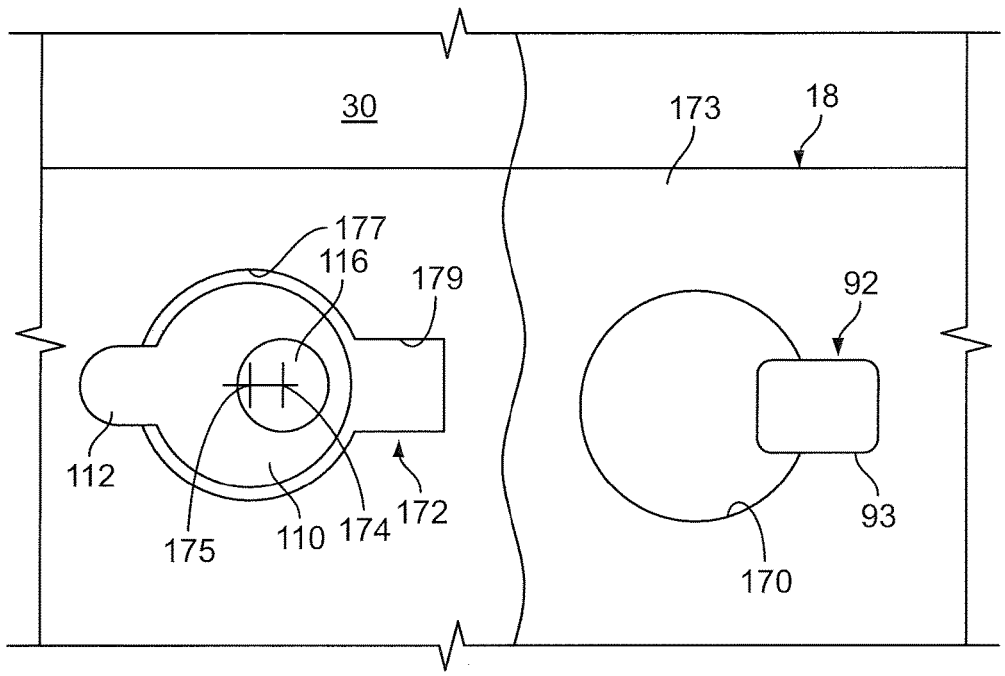
FIGS. 5B, 5C, 5D, and 5E are elevation views similar to FIG. 5A which are enlarged to illustrate the left lock member of the handle assembly being rotated approximately 180 degrees relative to the bottom frame member of the trailer about an offset axis to engage the rim of the aperture within which it is received in order to move the handle assembly (including the left and right lock members) axially to the left.
Figure 5C:
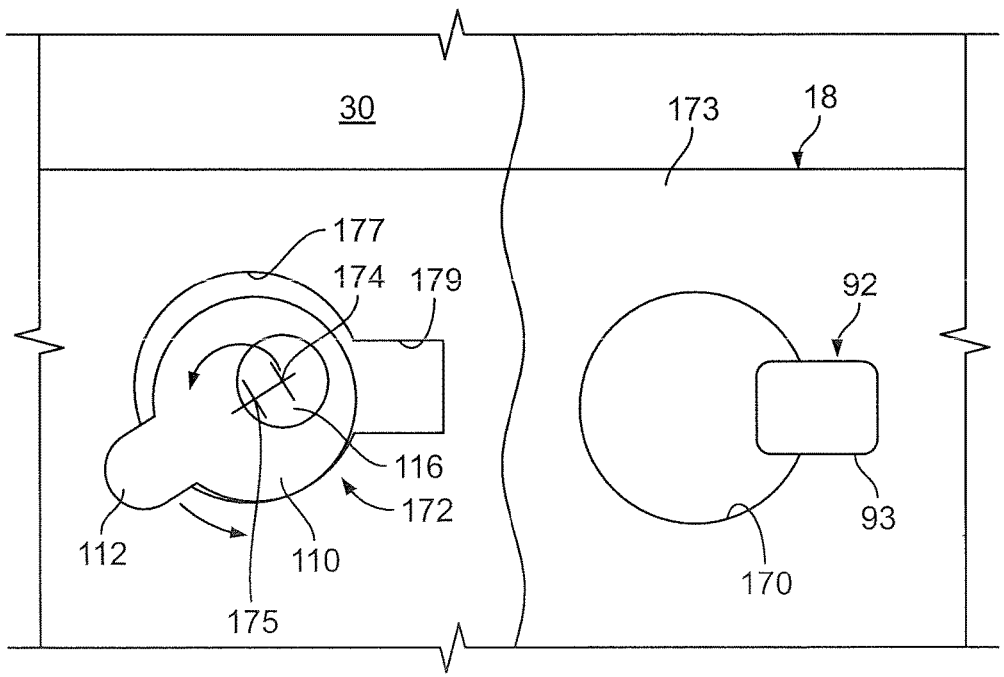
Figure 5D:
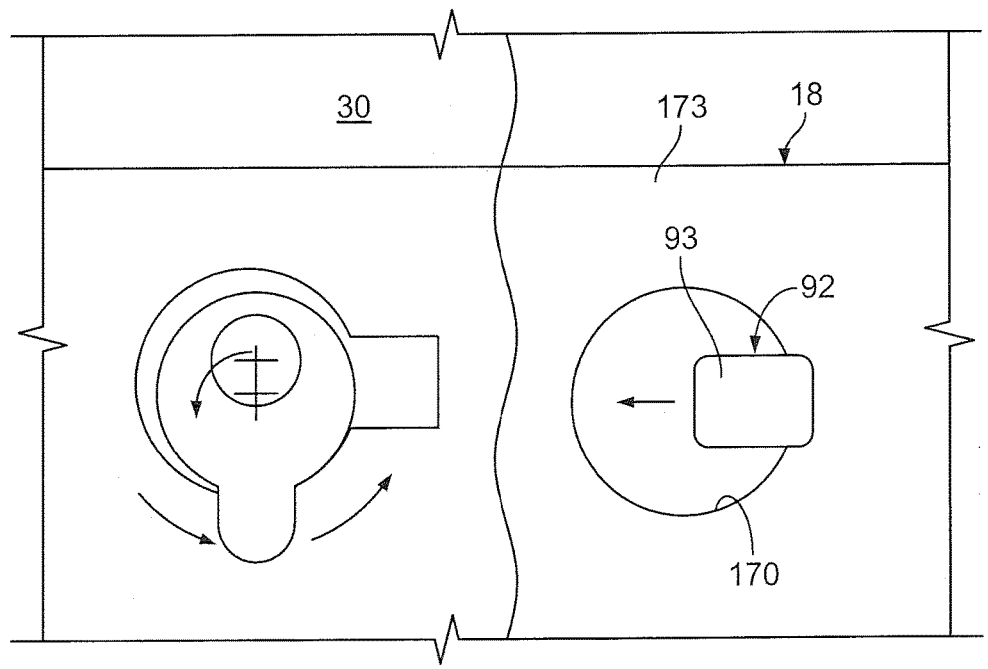
Figure 5E:
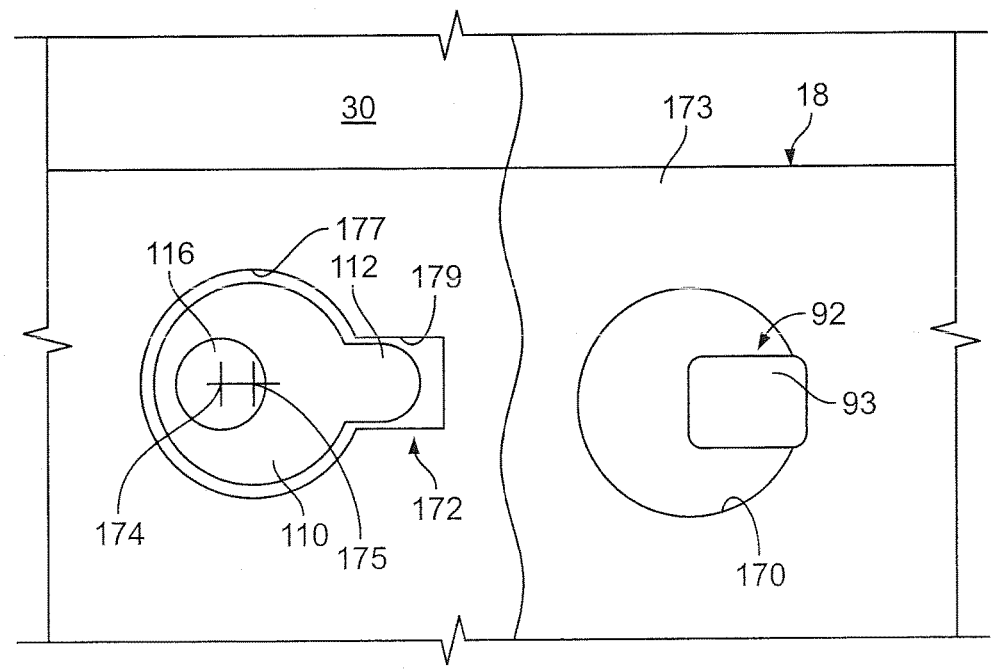

The elongated lever 70 further includes a second end including a first tab 86 having an aperture 88 formed therein and a second tab 90 spaced apart from the first tab 86. A flange 79 of the elongated lever 70 is positioned between the first and second ends of the elongated lever 70 and extends outwardly from a front surface 71 of the elongated lever 70. Illustratively, the flange 79 includes an aperture 84 formed therein. The elongated lever 70 further includes a generally hook-shaped lock member or protrusion 92 extending outwardly from a rear surface 73 of the tab 78, as shown in FIG. 3. In the illustrated embodiment, the protrusion 92 is hooked-shaped to facilitate engagement of the protrusion 92 with an aperture or locking passageway 170 formed in the sill 18 (shown in FIGS. 5A-5E and FIG. 7), although this disclosure contemplates other shapes of the protrusion 92. As is discussed in greater detail below, the protrusion 92 is received within the locking passageway 170 adjacent the lockrod keeper 45 in order to secure the handle assembly 46 to the trailer 10 in its locked position.

As noted above, the handle 72 of the handle assembly 46 is coupled to the lever 70 for pivoting movement of the handle 72 relative thereto. Illustratively, the handle 72 includes a grip portion 100, a tab 102 coupled to a first end of the grip portion 100, and a generally U-shaped clevis 104 coupled to a second end of the grip portion 100, as shown in FIGS. 2 and 3. The tab 102 is configured to be positioned adjacent the flange 79 of the lever 70 when the handle 72 is in the closed or locked position shown in FIG. 4 and includes an aperture 105 formed therein. Thus, when the handle 72 is in the locked position, the aperture 105 of the handle 72 and the aperture 84 of the flange 79 are configured to align with each other and receive a fastener or other conventional locking device, such as a screw, bolt, padlock, pin, or the like in order to secure the handle 72 to the lever 70. As such, the handle 72 is prevented from being pivotably moved relative to the lever 70 to an unlocked position. In other words, securing a fastener or other conventional lock through the apertures 84, 105 of the respective flange 79 and the handle 72 maintains the handle 72 in the locked position relative to the elongated lever 70.

The clevis 104 of the handle 72 includes a first arm or tab 106 coupled to the grip portion 100 and a arm or second tab 108 spaced-apart from the first tab 106. A second lock member or protrusion 110 of the handle 72 is coupled to and extends outwardly in a rearward direction from the second tab 108. As shown in FIG. 3, the protrusion 110 is generally cylindrical in shape to define a longitudinal axis 175 and includes a tab 112 extending outwardly therefrom. The protrusion 110 and tab 108 includes an aperture 114 formed therethrough. Illustratively, the clevis 104 is configured to receive the tab 86 of the lever 70 therein such that the aperture 107 of the tab 106, the aperture 88 of the tab 86 of the lever 70, and the aperture 114 of the tab 108 are aligned with each other and able to receive a fastener, such as a bolt or pin 116, therethrough, in order to pivotably couple the handle 72 to the lever 70.

Figure 12:
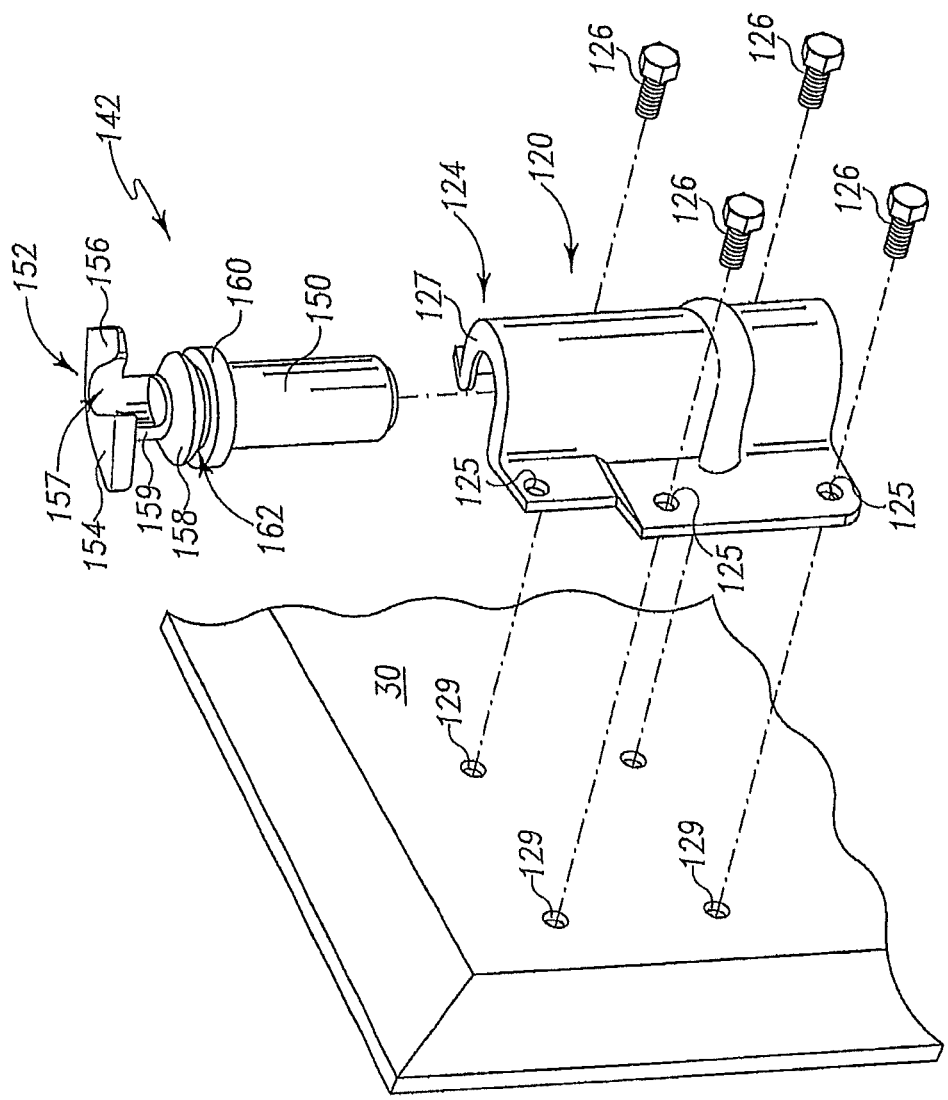
FIG. 12 is an exploded, perspective view of an upper portion of the door locking mechanism of FIGS. 2-10 showing an upper locking cam and an upper bearing plate.

As shown in FIG. 2, the locking mechanism 34 further includes a bearing plate 120 configured to be coupled to the locking cam 42 and the door 30 of the trailer 10. Illustratively, the bearing plate 120 defines a channel 121 having a generally semi-circular cross-sectional shape configured to receive at least a portion of the lockrod 36 and stem 50 of the locking cam 42 therein. Side flanges 123 of the bearing plate 120 include apertures 125 configured to receive fasteners, such as rivets, screws, or bolts 126 (shown in FIG. 4, for example) in order to secure the bearing plate 120 to the door 30 of the trailer 10. Illustratively, as shown in FIG. 12 with regards to an upper bearing plate 120, the door 18 may include pre-drilled holes 129 into which the fasteners 126 are received. A lower portion 122 of the bearing plate 120 is illustratively rolled to form a bottom surface (not shown) that is received within the channel 62 between the collars 58 and 60 of the locking cam 42 in order to coupled the bearing plate 120 to the locking cam 42. This rolled surface further extends at least partially about the locking cam 42 within the channel 62 such that the rolled surface of the bearing plate 120 is captured within the channel 62 between the collars 58, 60 of the locking cam 42.

Figure 13:
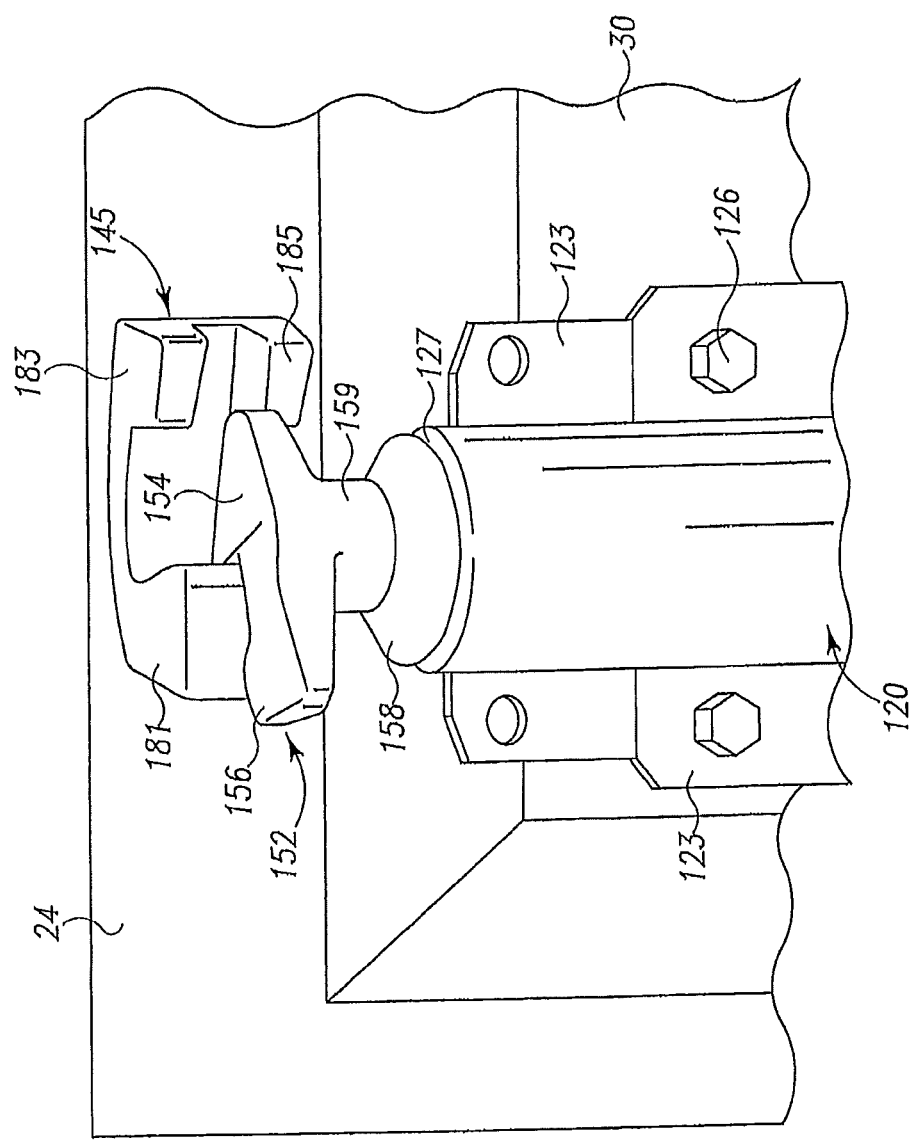
FIG. 13 is a perspective view of the upper portion of the door locking mechanism shown when the handle assembly has been drawn sufficiently away from the rear frame of the trailer to allow the trailer door to open.

Looking now to FIGS. 12 and 13, the door locking assembly 34 further includes the upper locking cam 142 including a stem 150 received within the upper end of the lockrod 36. The stem 150 is coupled to a cam body 152 defining a pair of lobes 154, 156 separated by a gap or channel 157. The cam body 152 extends downwardly to define a neck portion 159 and a collar 158 that extends about the neck portion 159. The upper locking cam 142 further defines a second collar 160 that is separated from the first collar 158 by a channel 162. As shown in FIGS. 12 and 13, the stem 150 of the locking cam 142 extends downwardly from the lower collar 160.

Likewise, as most clearly shown in FIGS. 12 and 13, an upper portion 124 of the upper bearing plate 120 is rolled to form a surface 127 that is received within the channel 162 of the upper locking cam 142 defined between the first and second collars 158, 160. The bearing plate 120 is attached to the door 30 adjacent to the free side and adjacent top of the door 30. With the upper, rolled surface 127 of the upper bearing plate 120 and the lower, rolled surface (not shown) of the lower bearing plate 120 received within the respective channels 162, 62 just described, axial motion of the lockrod 36 is inhibited while simultaneously allowing rotation of the lockrod 36 relative to the upper and lower bearing plates 120. This feature prevents so-called racking of the lockrod 36 relative to the upper and lower bearing plates 120 and the door 30.

As discussed above, the door locking mechanism 34 further includes the lower lockrod keeper 45 and the upper lockrod keeper 145. Illustratively, the lower lockrod keeper 45 is coupled to the bottom sill 18 of the trailer 10 and is configured to receive the cam body 52 of the lower locking cam 42 therein. Similarly, the upper lockrod keeper 145 is coupled to the top frame member 24 of the trailer 10 and is configured to receive the cam body 152 of the upper locking cam 142 therein. The lower keeper 45 that is attached to the bottom frame member or sill 18 defines lobes 81, 83, 85, wherein the lobe 81 defines a channel 87 therein. The lobes 83, 85 of the keeper 45 define a gap therebetween that is sized to receive a portion of the cam body 52 therein. The lobes 54 and 81 of the locking cam 42 and lower keeper 45 respectively are configured such that the lobe 54 of the locking cam 42 is received within the channel 87 defined in the lobe 81 of the lower keeper 45. In operation, the lobes 54 and 81 are engaged and disengaged at a predefined angle of the handle assembly 46 relative to the plane defined by the sill or lower frame member 18, as is discussed in greater detail below.

Similar to the lower lockrod keeper 45, the upper lockrod keeper 145 that is attached to the top frame member 22 defines lobes 181, 183, 185, wherein the lobe 181 defines a channel (not shown) therein. The lobes 183, 185 define a gap or channel therebetween that is sized to receive a portion of the cam body 152 therein. Illustratively, the love 154 of the locking cam 142 is configured to be received within the channel of the lobe 181 of the upper lockrod keeper 145. The lobes 154 and 181 are engaged and disengaged at a predefined angle of the handle assembly 46 relative to the plane defined by the bottom frame member 18.

In use, as noted above, the door locking mechanism 34 is movable between a fully locked position (shown in FIG. 2) and a fully unlocked position (shown in FIG. 11) whereby the door 30 is able to be opened relative to the rear trailer frame 16. Illustratively, in the fully locked position, the lock member 110 of the handle 72 is received within a key-shaped locking aperture 172 formed in the bottom sill 18 of the trailer 10, as shown in FIGS. 5A-5E. Illustratively, as shown in FIGS. 5A-5E, the aperture or locking passageway 172 defines a first passageway 177 in communication with a smaller, adjacent passageway 179. This configuration of the locking passageway 172 corresponds to one illustrative configuration of the protrusion or locking cam 110. Illustratively, the tab 112 of the protrusion 110 is adjacent to and engaged with a rear surface 173 of the sill 18 and is approximately 180° out of alignment with the passageway 179 of the aperture 172 such that the tab 112 operates as a latch to couple and secure the handle assembly 46 to the sill 18 and prevent a user from moving the handle assembly 46 away from the sill 18. Further, the protrusion or other lock member 92 of the lever 70 of the handle assembly 46 is received within the aperture 170 also formed in the sill 18 such that the end portion 93 of the lock member 92 is adjacent to and engaged with the rear surface 173 of the sill 18. As such, the end portion of the lock member 92 similarly operates as a latch to further prevent the handle assembly 46 from being moved away from the sill 18.

Figure 8:
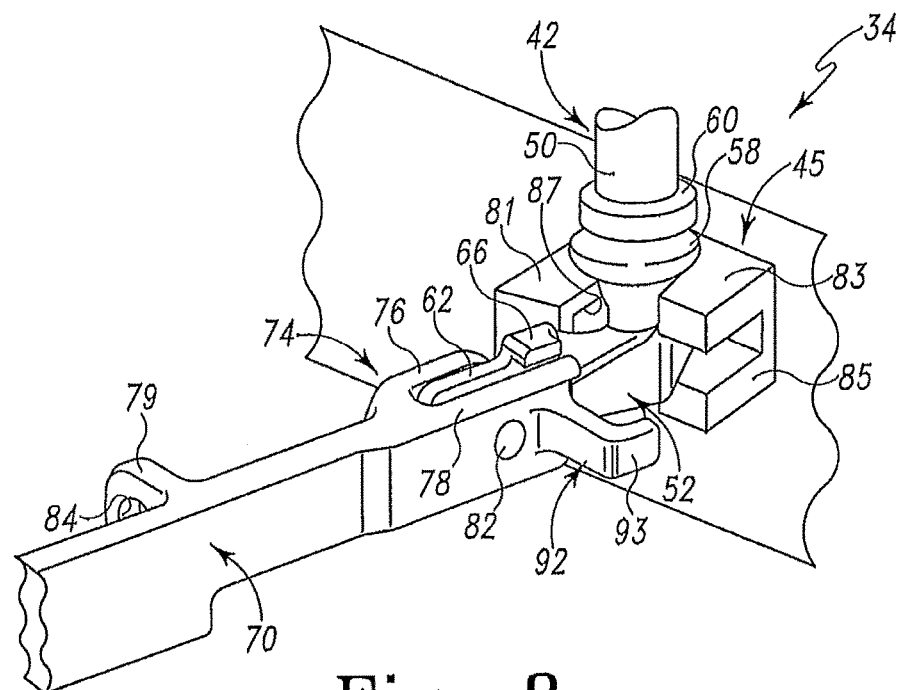
FIG. 8 is a perspective view of a portion of the handle assembly of FIGS. 1-9 showing a lever of the handle assembly in a first position adjacent a lower locking cam of the door locking mechanism.
Figure 9:
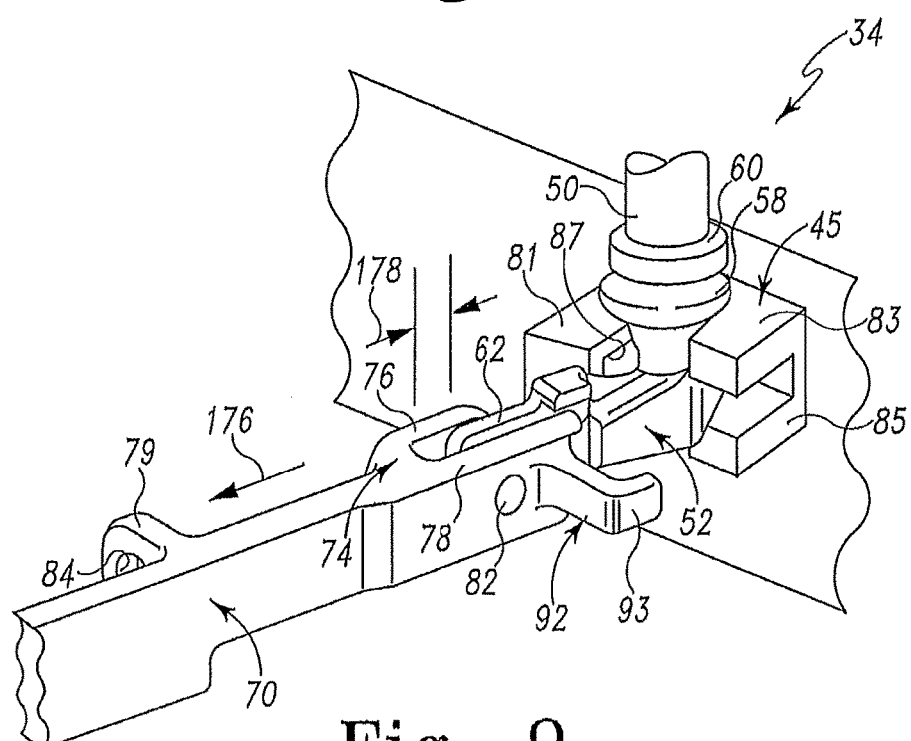
FIG. 9 is a perspective view similar to FIG. 8 showing the lever moved to a second surface position away from the lower locking cam to define a gap between one end of the lever and the lower locking cam.

In order to move the handle 72 to an unlocked position relative to the lever 70, the user must first remove any fasteners or other such locks from within the apertures 84, 105 of the lever 70 and the handle 72. Next, the handle 72 is pivoted about an offset pivot axis 174 defined by the bolt 116, as shown in FIGS. 3, 5A-5E, 6 and 7. Illustratively, the handle 72 is pivoted or rotated in a clockwise direction approximately 180.degree. such that the tab 112 of the lock member 110 of the handle 72 is aligned with the corresponding passageway 179 of the aperture 172 the sill 18 in order to prevent the tab 112 from catching on the sill 18 and allow the lock member 110 to be removed from within the aperture 172. With this motion, the lock member 110 of the handle 72 is disengaged from the aperture or locking passageway 172 defined in the bottom sill 18. As shown in FIGS. 8 and 9, a user may then slide the lever 70 relative to the locking cam 42 in a direction 176 away from the locking cam 42 in order to move the lock member 92 of the lever 70 relative to the sill 18 of the trailer and prevent the end portion 93 of the lock member 92 from catching on the sill 18. As noted in FIG. 9, sliding the handle assembly 46 relative to the lower locking cam 42 creates a gap 178 between an end of the protrusion 62 and an inner surface 180 of the clevis 74 of the lever 70 when the handle assembly 46 is fully extended. Likewise, in FIG. 8, the handle assembly 46 has been advanced toward the protrusion 62 to cause the gap 178 to disappear. This linear movement of the handle assembly 46 generally, and of the lever 70 specifically, further serves to facilitate locating the lock members 92 and 110 relative to the locking passageways 170 and 172 respectively of the sill 18 so that the lock members 92, 110 can be guided therein. In particular, linear movement of the handle assembly 46 to close the gap 178 causes the end 93 of the hook-shaped lock member 92 to catch on the portion of the bottom frame member surrounding the locking aperture 170 in order to secure the handle assembly 46 to the bottom frame member 18.

Figure 10:
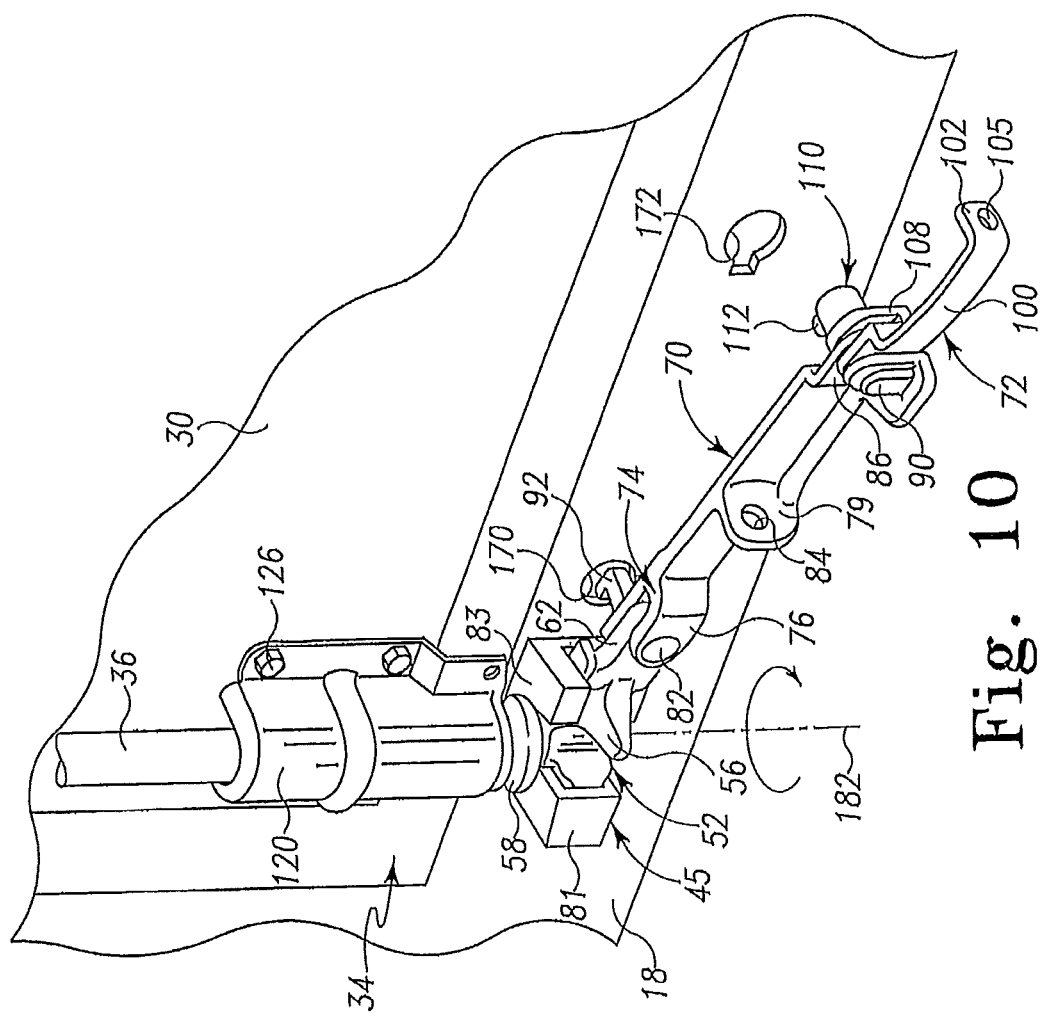
FIG. 10 is a perspective view similar to FIGS. 4 and 6 showing the handle assembly being drawn away from the rear frame of the trailer.
Figure 11:
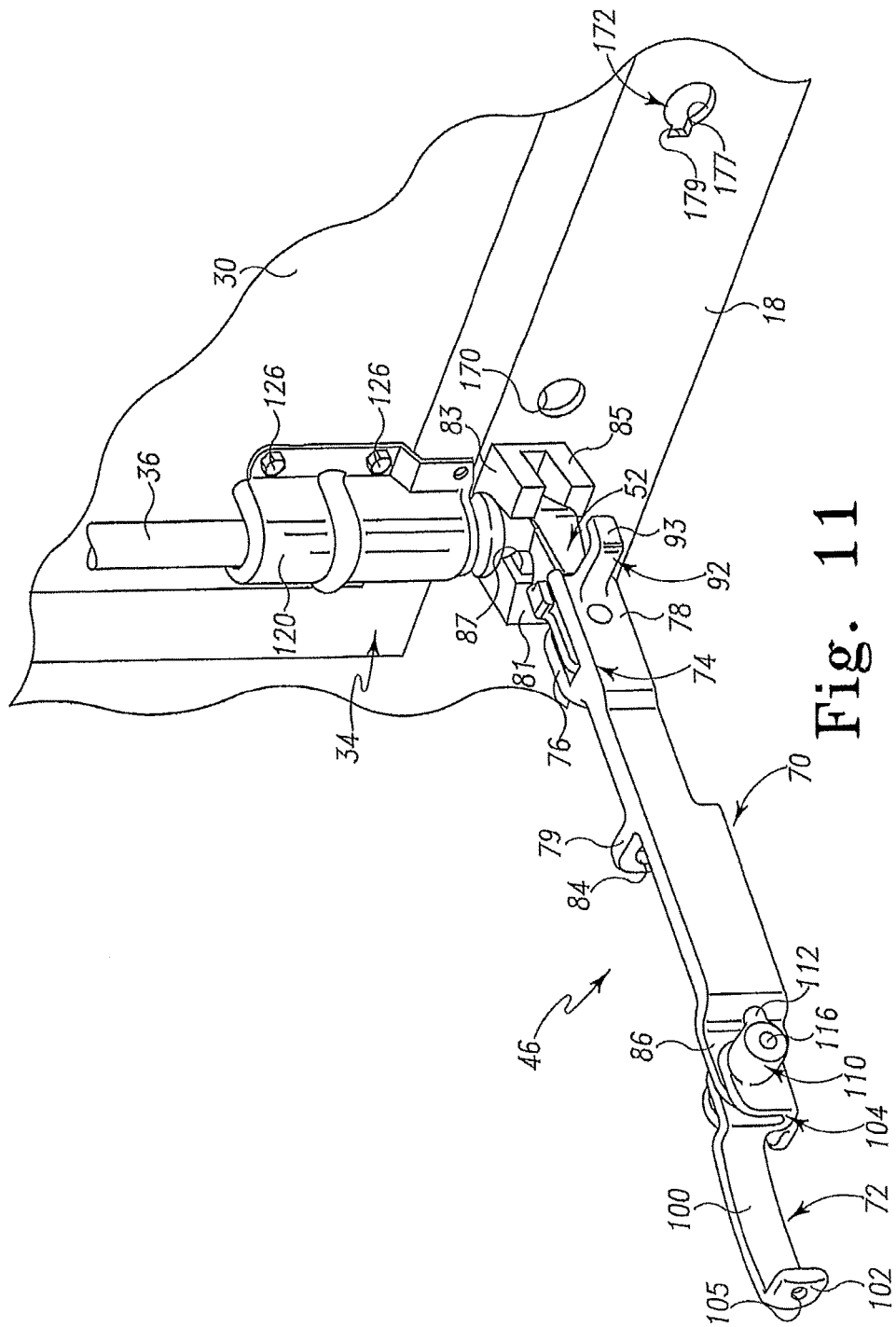
FIG. 11 is a perspective view similar to FIGS. 4, 6, and 8 showing the handle assembly drawn sufficiently away from the rear frame of the trailer to allow the trailer door to open.

Once the handle assembly 46 is unlocked from the sill 18 of the trailer 10, the user may rotate the entire handle assembly 46, locking cam 42, and locking rod 36 relative to the upper and lower lockrod keepers 145, 45 about a pivot axis 182 defined by the lockrod 36. As the handle assembly 46 is drawn away from the sill or lower frame member 18 as illustrated in FIGS. 10 and 11, the locking cam 42 and the lockrod 36 both rotate relative to the lockrod keeper 45 and relative to the door 30. Illustratively, the lower keeper 45 and the locking cam 42 are configured such that the lobe 54 engages and disengages the channel 87 defined in the lobe 81 of the keeper 45 at a predefined obtuse angle of the handle assembly 46 relative to the plane defined by the sill or lower frame member 18. In the specific embodiment illustrated in FIG. 11, this predefined angle is approximately 150° so that the lobe 54 of the cam 42 will not disengage the channel 87 defined in the lobe 81 of the keeper, and the door 17 therefore will not open, until the handle assembly 38B is rotated at least approximately 150°, as illustrated in FIG. 11, from its fully closed position in contact with the bottom frame member or sill 18 as illustrated in FIGS. 2 and 4. It will be understood, however, that the angle of approximately 150° is provided only by way of example, and that other obtuse angles generally, i.e., greater than 90° and up to 180°, may be used.

As with the lower locking cam 42 and lower lockrod keeper 45, the lobes 154 and 181 of the upper locking cam 142 and the upper lockrod keeper 145, respectively, are configured such that the lobe 154 is received within the channel 187 and the lobes 154 and 181 are engaged and disengaged at a predefined obtuse angle of the handle assembly 46 relative to the plane defined by the sill or lower frame member 18. The door 30 may thus be opened when the angle between the handle assembly 46 is moved to a position that is greater than or equal to the predefined obtuse angle, and at angles less than the obtuse angle the upper locking cam 142 engages the upper lockrod keeper 145 and the lower locking cam 42 engages the lower lockrod keeper 45 so that the door 30 remains in a closed position.

Figure 14:
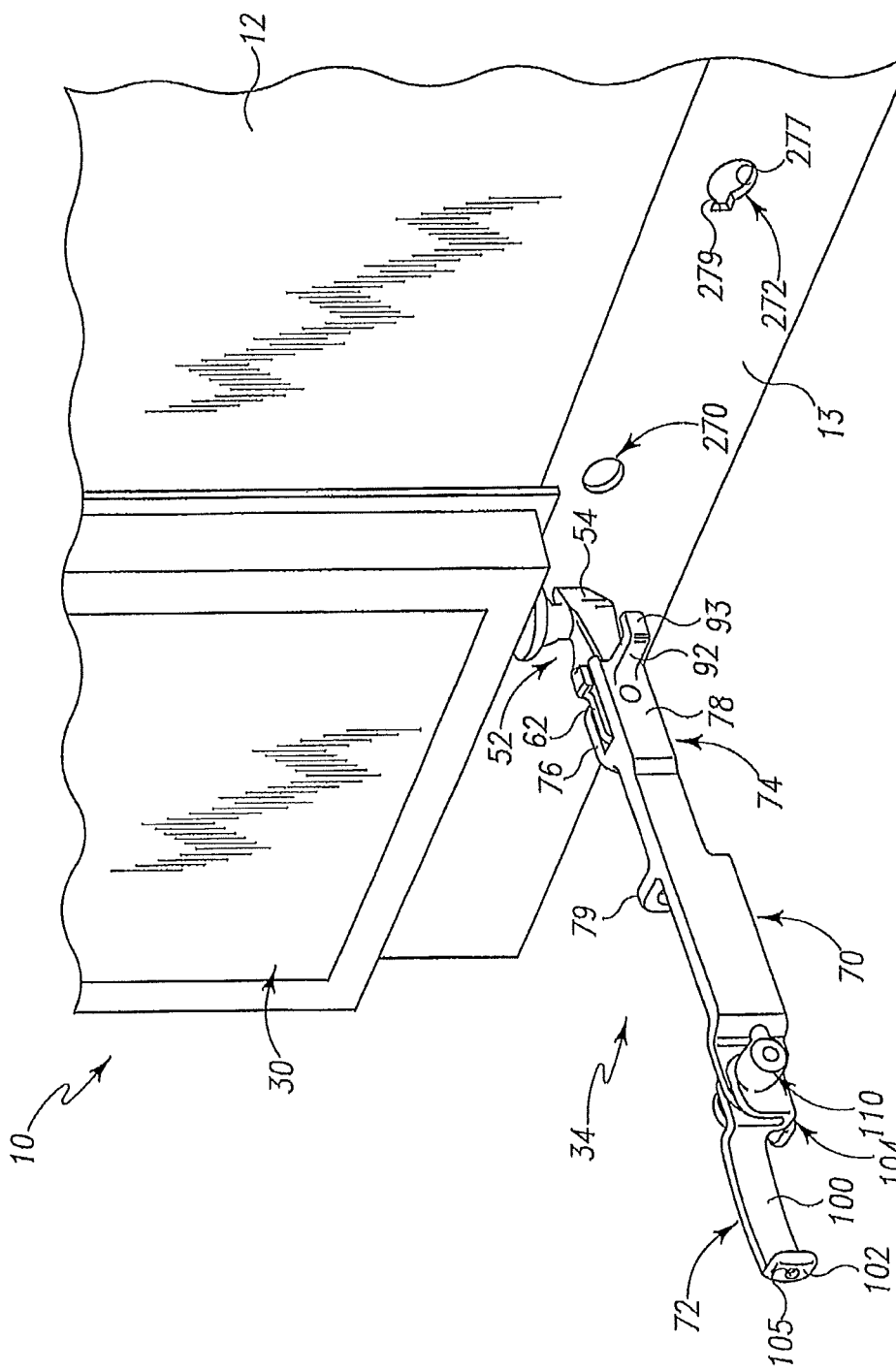
FIG. 14 is a side, perspective view the trailer showing the rear door of the trailer, including the locking mechanism of FIGS. 2-13 coupled thereto, in a fully opened position adjacent to a bottom side rail of a side wall of the trailer.
Figure 15:
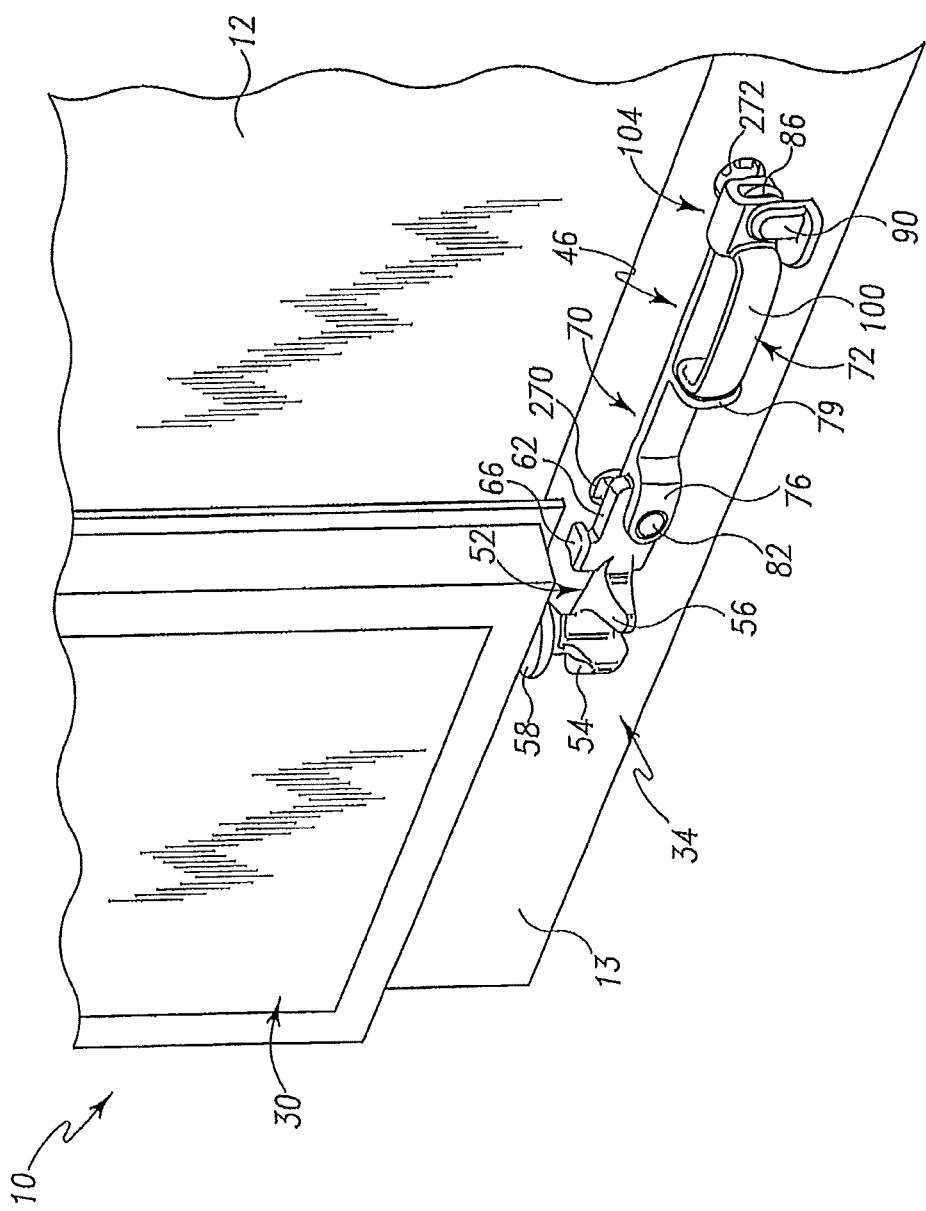
FIG. 15 is a perspective view similar to FIG. 14 showing the locking mechanism engaged with the bottom, side rail of the trailer and also showing the handle assembly in the locked position to secure the locking mechanism to the bottom rail of the trailer when the rear door is in the fully opened position.

Referring now to FIGS. 14 and 15, the handle assembly 46 and the base rail 13 of the trailer 10 are both configured to allow the handle assembly 46 to be secured to the base rail 13 so that the door 30 can thereby be secured to the bottom rail 13 in its fully open position. As illustrated in FIGS. 14 and 15, the door 30 in a fully opened position adjacent the sidewall 12 of the trailer 10. Similar to the bottom frame member 18, the bottom, side rail 13 defines two locking passageways 270 and 272 therein. The locking passageway 272 defines an opening 277 and a smaller opening 279 in communication with the opening 277 such that the passageway 272 is generally keyhole-shaped. In other words, the locking passageway 272 is illustratively configured identically to the locking passageway 172 defined in the sill or bottom frame member 18. Similarly, the locking passageway 270 is illustratively configured identically to the locking passageway 170 defined in the bottom frame member 18, as shown in FIGS. 5A-5E. Furthermore, the locking passageways 270 and 272 are sized and positioned on to the bottom rail 13 so as to receive and engage the lock members 110 and 92 respectively.

When the handle 72 is moved from its open position, as illustrated in FIG. 14, to its closed position as illustrated in FIG. 15, the lock member 110 of the handle 72 rotates approximately 180° about the offset pivot axis 174 such that the tab 112 of the protrusion 110 engages a portion of the bottom rail 13 surrounding, or adjacent to, the locking passageway 372. As also illustrated in FIG. 15, the handle assembly 46 is secured to the bottom rail 13 by engaging the lock member 92 with the bottom rail 13 about, or adjacent to, the locking passageway 370 and by engaging the lock member 110 with the bottom rail 13 about, or adjacent to, the locking passageway 372, by rotating the handle 72 about the offset pivot axis 174 from its open position (illustrated in FIGS. 14 and 15) to its closed position (illustrated in FIG. 15) when the lock member 110 is completely received within the locking passageway 372. Similarly, the handle assembly 46 is unsecured, or released, from the bottom rail 13 by disengaging the lock member 92 from the bottom rail 13 about, or adjacent to, the locking passageway 370 and by disengaging the lock member 110 from the bottom rail 13 about, or adjacent to, the locking passageway 372, by rotating the handle 72 from its closed position to its opened position. Illustratively, therefore, the handle assembly 46 is secured to, and unsecured from, the sill 18 in the same as or substantially similar manner in which the handle assembly is secured to the side frame 13.

Figure 16:
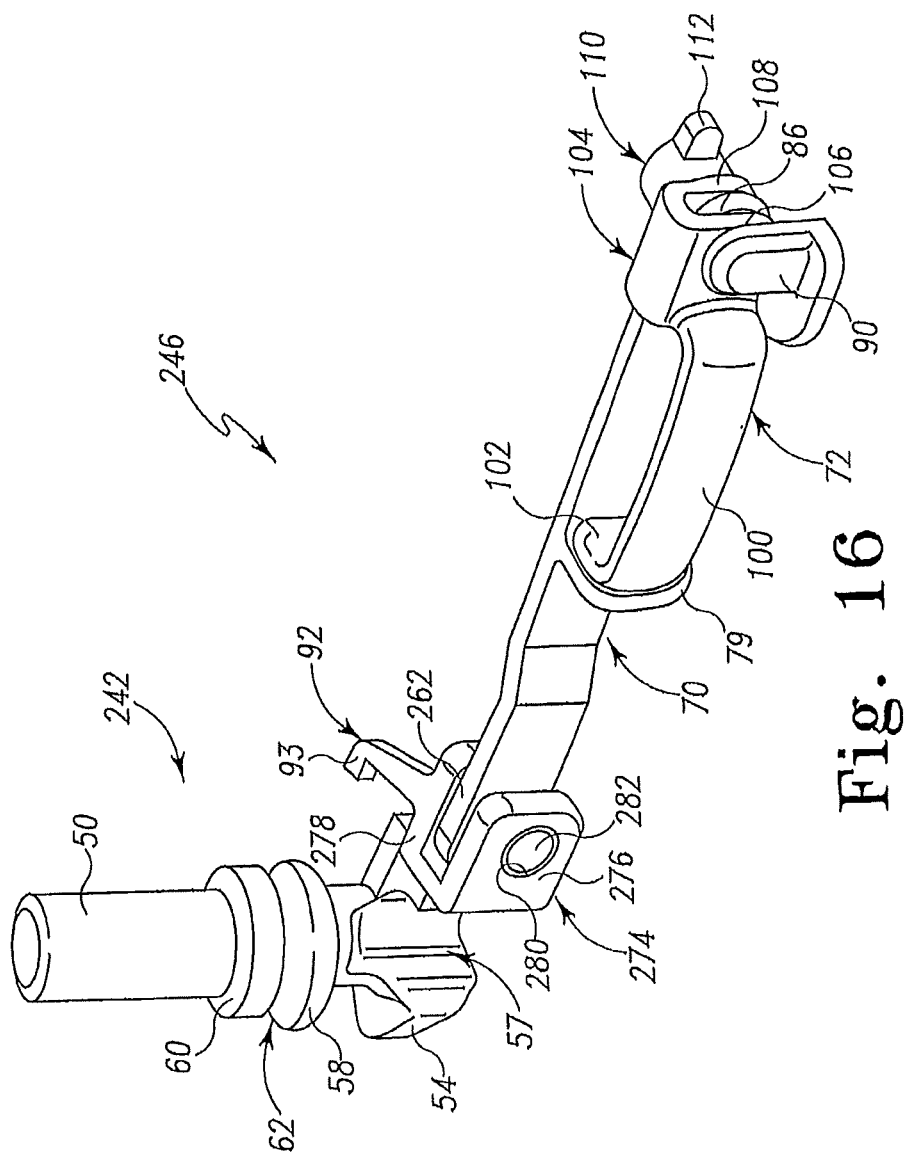
FIG. 16 is a perspective view of another handle assembly of the door locking mechanism of the present disclosure.

Looking know to FIG. 16, another lower locking cam 242 and handle assembly 246 are provided. Illustratively, many of the features of the locking cam 242 and handle assembly 246 are the same as or similar to the features of the locking cam 42 and handle assembly 46 shown in FIGS. 1-11. As such, like reference numerals are used to denote like features or components. In contrast to the locking cam 42 and handle assembly 44 shown in FIGS. 1-11, however, the locking cam 242 includes a clevis 274 and the handle assembly 246 includes a first end 262 received within the clevis 274 in order to slidably couple the handle assembly 246 to the locking cam 242. The first end 262 includes an aperture (not shown) such that a fastener, such as a pin 282 is received within an aperture 280 formed in each tab 276, 278 of the clevis 274 as well as the slot of the lever 270 of the handle assembly 246 such that the lever 270 is movably, e.g., rotatably, mounted to the clevis 274 to allow relative movement therebetween. Alternatively, the first end 262 of the lever 270 may be configured to define a slot (not shown) for receiving the pin 282 therethrough in order to allopw the lever 270 to move axially relative to the locking cam 242. Further illustratively, the lock member 92 is coupled to and extending rearwardly outwardly from the tab 278 of the locking cam 242, as shown in FIG. 16.

Figure 17:
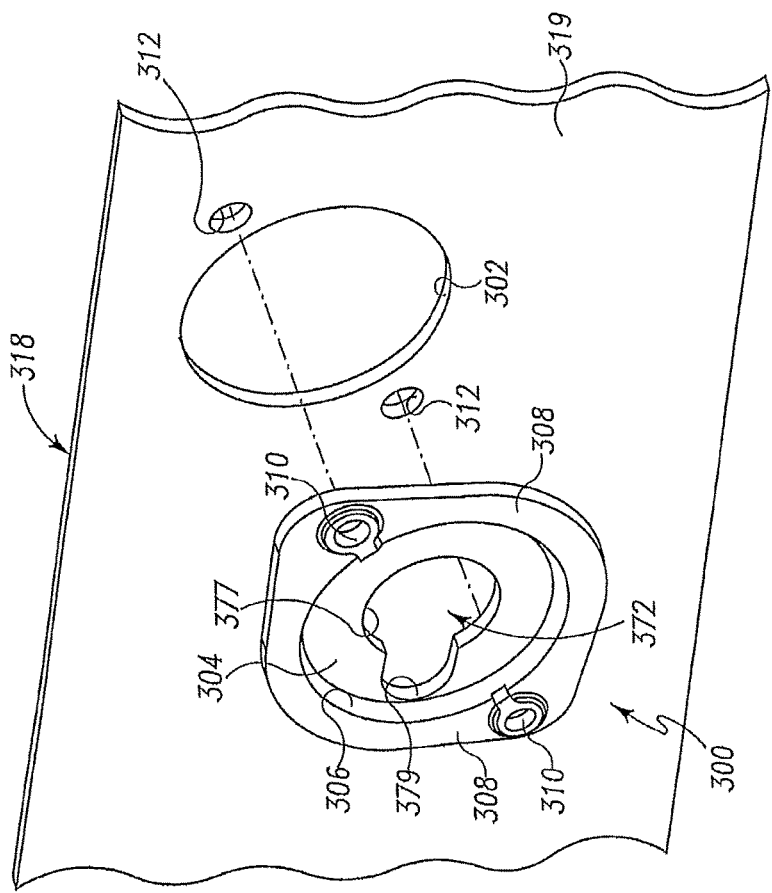
FIG. 17 is an exploded perspective view of an insert configured to be received within an aperture of the bottom sill and/or bottom, side rail of the trailer.

Looking now to FIG. 17, an insert 300 is provided to be press-fit or snapped within a generally circular aperture 302 of another lower sill plate 318 of the trailer 10. Illustratively, the insert 300 is made of a plastic material; however, it is understood that other suitable materials, including metals, for example, may be used as well. As shown in FIG. 17, the insert 300 includes circular body or end wall 304, a cylindrical wall 306 having a first end coupled to a perimeter of the body 304 and extending downwardly therefrom, and a flange 308 extending outwardly around a perimeter of a second end of the wall 306. Illustratively, the circular body 304 includes an aperture 372 formed therethrough. As shown in FIG. 17, the aperture 372 of the insert 300 is the same shape and size as the aperture 172 formed in the sill plate 18 of the trailer 10, as shown in FIGS. 5A-5E, 7, 10, and 11. As such, the aperture 372 includes a first passageway 377 in communication with a smaller, adjacent passageway 179 to define a generally keyhole-shaped passageway 372. The insert 300 further includes apertures 310 formed through the flange 308. In use, the insert 300 is press-fit or snapped into the aperture 302 formed in the sill 318 such that a rear surface (not shown) of the flange 308 is adjacent a front surface 319 of the sill 318. The position of the insert 300 may be adjusted in order to align the apertures 310 of the insert 300 with pre-drilled apertures 312 formed in the sill 318 and a fastener, such as a rivet, screw, bolt, etc., may be inserted through each of the apertures 310, 312 in order to couple the insert 300 to the sill 318. While the insert 300 is illustratively shown to be received within the aperture 302 of the bottom sill 318, it should be understood that the insert may be received within other apertures formed in the trailer 10. For example, the side rail 13 of the trailer 10 may include a similar aperture 302 rather than the aperture 272 shown in FIG. 14 in order for receiving the insert 300 therein.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A locking assembly for a door of a storage container, the storage container defining a door frame, the door movably mounted to the door frame, the locking assembly comprising:

a lockrod configured to be coupled to the door;

a locking cam coupled to an end of the lockrod and adapted to engage a lockrod keeper coupled to the door frame; and a handle assembly coupled to the locking cam, wherein the handle assembly includes an elongated lever having one end coupled to the locking cam and a handle pivotably coupled to an opposite end thereof by a pin defining an offset pivot axis, wherein the handle includes a lock member coupled to the handle for pivoting movement therewith about the offset pivot axis and relative to the elongated lever, and wherein the lock member defines a cylindrical shape having a longitudinal axis spaced-apart from the pivot axis and configured to pivot about the offset pivot axis, and wherein the lock member is configured to be received within an aperture in the door frame and is configured to engage an outer edge defining the aperture upon pivoting movement of the handle and lock member about the offset pivot axis in order to move the handle assembly axially relative to the locking cam.

2. The locking assembly of claim 1, wherein the lock member is movable between a first position wherein the lock member is configured to be received through the aperture in the door frame and a second position wherein the lock member is pivoted relative to the elongated lever and a portion of the lock member is configured to engage an inner surface of the door frame, and wherein the offset pivot axis of the lock member causes an outer surface of the cylindrical lock member to engage and act upon the outer edge defining the aperture of the door frame through which the lock member is received in order to move the lock member with the elongated lever in the axial direction relative to the locking cam when the lock member is moved from the first position to the second position.

3. The locking assembly of claim 2, wherein the lock member includes a tab extending outwardly therefrom and wherein the tab is configured to engage the inner surface of the door frame when the lock member is in the second position.

4. The locking assembly of claim 1, wherein the lock member is configured to pivot approximately 180 degrees from the first position to the second position.

5. The locking assembly of claim 1, wherein the elongated lever includes a flange positioned between opposite ends of the elongated lever, and wherein the handle is movable relative to the elongated lever between a first position wherein one end of the handle is adjacent the flange and a second position wherein the same end of the handle is spaced-apart from the flange.

6. The locking assembly of claim 1, wherein one of the locking cam and the handle assembly includes a lateral slot and wherein the other one of the locking cam and the handle assembly is coupled thereto through the lateral slot in order to provide for axial movement of the handle assembly relative to the locking cam along the lateral slot.

7. The locking assembly of claim 6, wherein the locking cam includes a protrusion having the lateral slot formed therein, and the elongated lever of the handle assembly is coupled to the protrusion for lateral movement relative thereto along the longitudinal axis defined by the slot.

8. A locking assembly for a door of a storage container, the storage container defining a door frame, the door movably mounted to the door frame, the locking assembly comprising:

a lockrod configured to be coupled to the door;

a locking cam coupled to an end of the lockrod and adapted to engage a lockrod keeper coupled to the door frame; and a handle assembly coupled to the locking cam, wherein the handle assembly includes an elongated lever having one end coupled to the locking cam and a handle pivotably coupled to an opposite end thereof, wherein the handle includes a lock member having a longitudinal axis and configured to pivot with the handle relative to the elongated lever about an offset pivot axis that is spaced-apart from and parallel to the longitudinal axis of the lock member, and wherein pivoting movement of the lock member about the offset pivot axis from a first position to a second position urges the elongated lever to move axially toward the locking cam, and wherein the locking cam includes a lateral slot and the elongated lever is configured to move axially along the lateral slot relative to the locking cam between a first, unlocked position and a second, locked position, and wherein the elongated lever is closer to the lockrod when the elongated lever is in the second, locked position than when the lockrod is in the first, unlocked position.

9. The locking assembly of claim 8, wherein the offset lock member is configured to be received through an aperture in the door frame in order to lock the door to the door frame when the offset lock member is in the second position.

10. The locking assembly of claim 8, wherein the offset lock member is coupled to a first end of the handle that is pivotably coupled to the elongated lever, and wherein a second end of the handle is spaced-apart from the elongated lever when the offset lock member is in the first position and is adjacent the elongated lever when the offset lock member is in the second position.

11. A locking assembly for a door of a storage container, the storage container defining a door frame, the door movably mounted to the door frame, the door being movable to and from a door locked position and a door unlocked position, the locking assembly comprising:

a lockrod configured to be coupled to the door;

a locking cam coupled to an end of the lockrod and adapted to engage a lockrod keeper coupled to the door frame; and a handle assembly coupled to the locking cam, wherein the handle assembly includes an elongated lever having one end coupled to the locking cam and a handle pivotably coupled to an opposite end thereof, wherein the locking assembly includes means for urging the elongated lever to move axially away from the locking cam while pivoting the handle from the door unlocked position to the door locked position.

12. The locking assembly of claim 11, wherein the handle includes means for urging the elongated lever to move axially toward the locking cam while pivoting the handle from the door locked position to the door unlocked position.

13. The locking assembly of claim 11, wherein movement axially facilitates locating lock members relative to locking passageways in the door frame so that the lock members can be guided therein.

14. The locking assembly of claim 13, wherein one of the passageways is key-shaped.

15. The locking assembly of claim 11, wherein pivoting the handle from the door unlocked position to the door locked position moves the handle through approximately 180°.

16. The locking assembly of claim 11, wherein pivoting the handle from the door unlocked position to the door locked position pivots the handle about an offset pivot axis.

17. A locking assembly for a door of a storage container, the storage container defining a door frame, the door movably mounted to the door frame, the door being movable to and from a door locked position and a door unlocked position, the locking assembly comprising:

a lockrod configured to be coupled to the door;

a locking cam coupled to an end of the lockrod and adapted to engage a lockrod keeper coupled to the door frame; and a handle assembly coupled to the locking cam, wherein the handle assembly includes an elongated lever having one end coupled to the locking cam and a handle pivotably coupled to an opposite end thereof, wherein the locking assembly includes means for urging the elongated lever to move axially away from the locking cam while pivoting the handle from the door unlocked position to the door locked position, wherein pivoting the handle from the unlocked position to the locked position moves a protrusion on the handle axially away from the locking cam while the protrusion engages the door frame to lock the door.

18. The locking assembly of claim 17, wherein the protrusion includes a tab for engaging the door frame to lock the door.

19. A locking assembly for a door of a storage container, the storage container defining a door frame, the door movably mounted to the door frame, the door being movable to and from a door locked position and a door unlocked position, the locking assembly comprising:

a lockrod configured to be coupled to the door;

a locking cam coupled to an end of the lockrod and adapted to engage a lockrod keeper coupled to the door frame; and a handle assembly coupled to the locking cam, wherein the handle assembly includes an elongated lever having one end coupled to the locking cam and a handle pivotably coupled to an opposite end thereof, wherein the locking assembly includes means for urging the elongated lever to move axially away from the locking cam while pivoting the handle from the door unlocked position to the door locked position, wherein pivoting the handle from the door locked position to the door unlocked position moves a protrusion on the handle axially toward the locking cam while the protrusion disengages the door frame to unlock the door.

* * * * *